US012731124B2

(12) United States Patent
Kelly et al.

(10) Patent No.: US 12,731,124 B2
(45) Date of Patent: Sep. 8, 2026

(54) SYSTEMS AND METHODS FOR DYNAMIC AND FLEXIBLE BENEFICIARY ANALYSIS

(71) Applicant: Wells Fargo Bank, N.A., San Francisco, CA (US)

(72) Inventors: Christine L. Kelly, Houston, TX (US); Kelly A. Homrighausen, Saint Peter, MN (US); Paula Reed, Plymouth, MN (US); Peter Chou, Hicksville, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 41 days.

(21) Appl. No.: 18/470,874

(22) Filed: Sep. 20, 2023

(65) Prior Publication Data

US 2025/0094957 A1 Mar. 20, 2025

(51) Int. Cl.
*G06Q 20/22* (2012.01)
*G06Q 20/40* (2012.01)

(52) U.S. Cl.
CPC ........... *G06Q 20/227* (2013.01); *G06Q 20/40* (2013.01)

(58) Field of Classification Search
CPC ........ G06Q 40/00
USPC ........ 705/35, 38
See application file for complete search history.

(56) References Cited

U.S. PATENT DOCUMENTS 6,012,035 A * 1/2000 Freeman, Jr. ........ G06Q 20/105 705/40
6,324,516 B1 * 11/2001 Shults .......... G06Q 10/10 705/2
6,415,267 B1 * 7/2002 Hagan .......... G06Q 40/00 705/36 R
6,826,536 B1 * 11/2004 Forman .......... G06Q 10/10 705/3
6,934,692 B1 * 8/2005 Duncan .......... G06Q 30/06 705/26.25
7,340,401 B1 * 3/2008 Koenig .......... G06Q 40/08 600/300
7,356,516 B2 * 4/2008 Richey .......... G06Q 30/0253 705/16
7,395,219 B2 * 7/2008 Strech .......... G06Q 40/00 705/4
7,454,376 B1 * 11/2008 Argenbright .......... G06Q 40/06 705/37
7,467,094 B2 * 12/2008 Rosenfeld .......... G06Q 30/04 340/539.18
7,580,877 B1 * 8/2009 Argenbright .......... G06Q 40/10 705/37
7,606,721 B1 * 10/2009 Donnelly .......... G16H 10/60 705/40

(Continued)

*Primary Examiner* — Kirsten S Apple
(74) *Attorney, Agent, or Firm* — K&L Gates LLP

(57) ABSTRACT

Systems, apparatuses, methods, and computer program products are disclosed for generating and providing a beneficiary feedback response. An example method includes receiving an inquiry request and identifying a beneficiary account for a beneficiary of interest. The example method further includes determining at least one process to be performed on the inquiry data and (i) generating a verification response, (ii) a scoring response, and/or (iii) an analytics response. The example method further includes generating a beneficiary feedback response which includes the verification response, the scoring response, and/or the analytics response and providing the beneficiary feedback response.

20 Claims, 17 Drawing Sheets

(56) References Cited

U.S. PATENT DOCUMENTS 7,657,441 B2 * 2/2010 Richey ................. G06Q 20/403 705/30
8,918,306 B2 * 12/2014 Cashman ............ H04L 63/0815 703/2
2002/0049670 A1 * 4/2002 Moritsu ................. G06Q 20/14 705/40
2002/0077867 A1 * 6/2002 Gittins ................... G06Q 40/08 705/4
2003/0130873 A1 * 7/2003 Nevin .................... G16H 50/20 705/3
2003/0225690 A1 * 12/2003 Eaton ..................... G06Q 30/04 705/40
2003/0233292 A1 * 12/2003 Richey ................... G06Q 40/12 705/28
2004/0083123 A1 * 4/2004 Kim ....................... G16H 10/65 705/2
2004/0153382 A1 * 8/2004 Boccuzzi .............. H04M 15/73 705/34
2007/0192143 A1 * 8/2007 Krishnan ............... G16H 10/20 600/300
2008/0059351 A1 * 3/2008 Richey ................... G06Q 20/20 705/35
2013/0290178 A1 10/2013 Masie
2014/0046838 A1 2/2014 Dogin
2016/0267484 A1 * 9/2016 Smoley .............. G06Q 20/4016
2016/0379298 A1 * 12/2016 Isaacson ............ G06Q 30/0633 705/26.62
2017/0076283 A1 * 3/2017 Dintenfass ......... G06Q 20/3825
2021/0065291 A1 3/2021 Gaivironsky

* cited by examiner

SYSTEMS AND METHODS FOR DYNAMIC AND FLEXIBLE BENEFICIARY ANALYSIS

BACKGROUND

Entities may transact with beneficiaries using a variety of different payment types. Each payment type may be associated with a different set of benefits and risks, which may make it difficult for the entity to select a particular payment type for the transaction.

BRIEF SUMMARY

As described above, entities may transact with beneficiaries using a variety of different payment types. Each payment type has its own set of benefits and risks for all parties involved in the transaction. In order to transact with the beneficiary, the entity may acquire beneficiary information, such as from the beneficiary or a third-party source. However, the entity may be unaware of whether the provided beneficiary information is accurate for the beneficiary or further, to what extent the beneficiary information is accurate. As such, a transaction with such a beneficiary may present certain risks, such as a fraud risk, which may be exacerbated by risks associated with a selected payment type. For example, if the entity has transacted with a beneficiary with falsified beneficiary information using a wire transfer payment type, this transaction cannot be reversed due to the payment type.

Conventional systems fail to provide entities with an indication of an accuracy of beneficiary information for a beneficiary with whom they would like to transact with. Furthermore, these systems fail to provide an analysis of historical beneficiary patterns that the entity may wish to be informed of. For example, it may be useful for an entity to know if the beneficiary has a high incidence of initiating returns for a certain payment type or multiple payment types or whether the beneficiary has recently had a successful transaction of particular payment type. These insights may aid the entity with selecting a particular payment type for a transaction with the beneficiary or may inform the entity that the beneficiary has displayed concerning behavior patterns that may require additional verification checks for the beneficiary prior to performing a transaction with the particular beneficiary.

In contrast to these conventional techniques for effectuating transactions, example embodiments described herein are configured to generate and provide a beneficiary feedback response regarding a beneficiary of interest for a requesting entity. In particular, a requesting entity may provide an inquiry request indicative of a beneficiary of interest and may select one or more processes to be performed on beneficiary accounts. One such process is a verification process for which operations may be performed to generate a verification response indicative of an accuracy of one or more supplied beneficiary inquiry data values (e.g., data values known and provided by the requesting entity) such that the requesting entity may be made aware of an accuracy for one or more data values and/or data fields of interest. Another process is a scoring process for which operations may be performed to generate a scoring response indicative of a classification category for one or more scored payment types of interest such that the requesting entity may be made aware of particular metrics (e.g., return rates) of the beneficiary for individual payment types. Another process is an analytics process for which operations may be performed to generate an analytics response indicative of a classification category for one or more analytic payment types of interest such that the requesting entity may be made aware of whether a beneficiary has a successful history of transacting in a particular payment type. Example embodiments described herein are then configured to generate a beneficiary feedback response that includes one or more of the verification response, scoring response, and/or analytics response that may then be provided to the requesting user. The requesting user may then leverage the information in the beneficiary feedback response to make a determination regarding a transaction with the beneficiary of interest. In this way, the requesting entity may save valuable computational and manual resources that would otherwise be devoted to modifying a payment type for a transaction and selectively using such resources only for beneficiaries with concerning behavior patterns.

Each of the various processes may leverage account data stored within a shared account repository that includes limited account data for users associated with financial institutions which are enrolled in a data sharing program, as well as account data stored within an internal account repository that includes private account data, including historical transaction data. By leveraging both publicly shared account data and private internal account data, a robust analysis of beneficiary accounts is able to be performed to yield a comprehensive beneficiary feedback response.

In some embodiments, the requesting entity may further optimize computational resources by allowing for the automatic effectuation of a transaction in a particular payment type, which may be indicated in the inquiry request, based on an analysis of a verification response, scoring response, and/or analytics response. The requesting entity may configure individual and flexible thresholds that must be satisfied by the verification response, scoring response, and/or analytics in order for a transaction to be effectuated. In an instance the thresholds are satisfied, the transaction may automatically be effectuated without input from the requesting entity. As such, the requesting entity may be assured that the beneficiary was determined to satisfy the criteria required for such a transaction without having to manually intervene.

In some embodiments, the one or more processes (e.g., verification process, scoring process, and analytics process) may be performed simultaneously, via parallel processing, such that a beneficiary feedback response may be generated in real-time or near real-time. Thus, this may allow a corresponding transaction to also be performed in real-time or near real-time such that any perceived delay due to these additional processes is mitigated.

Additionally, in some embodiments described herein, a beneficiary optimization response may be provided to the requesting entity, such as in a beneficiary feedback response. The beneficiary optimization response may include one or more enhanced alternative payment types that were determined to be preferential for the requesting entity for the particular transaction with the beneficiary. As such, the requesting entity may select the one or more enhanced alternative payment types such that a more effective payment type for the transaction may be selected and the transaction may be automatically modified to reflect this updated payment type. In this way, the requesting entity may know an optimal payment type is selected for the transaction.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
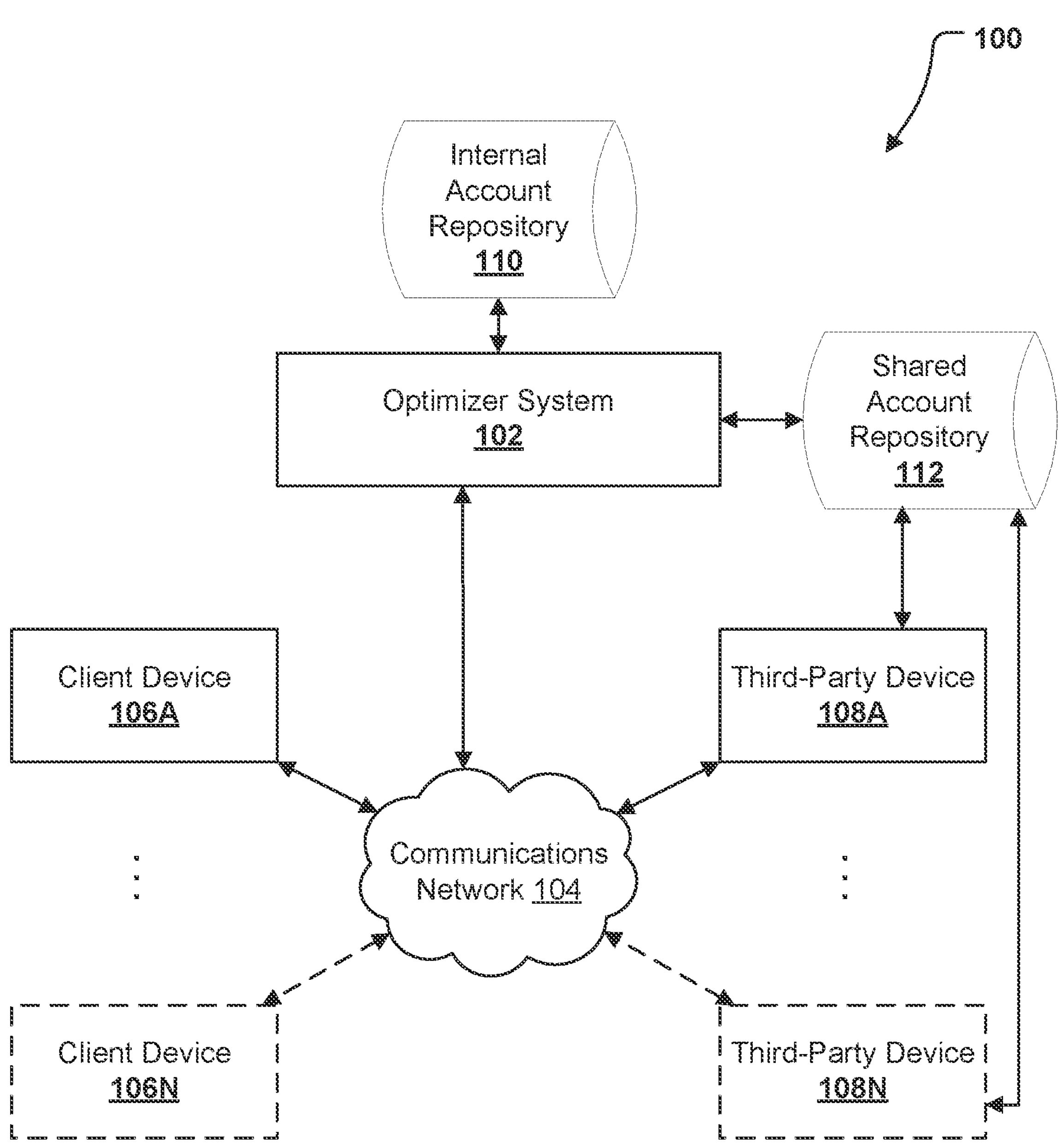
FIG. 1 illustrates a system in which some example embodiments may be used to provide a beneficiary feedback response and/or a beneficiary optimization response.

Example embodiments described herein may be implemented using any of a variety of computing devices or servers. To this end, FIG. 1 illustrates an example environment 100 within which various embodiments may operate. As illustrated, an optimizer system 102 may receive and/or transmit information via communications network 104 (e.g., the Internet) with any number of other devices, such as one or more of client device 106A-106N and/or third-party devices 108A-108N.

The optimizer system 102 may be implemented as one or more computing devices or servers, which may be composed of a series of components. Particular components of the optimizer system 102 are described in greater detail below with reference to apparatus 200 in connection with FIG. 2.

In some embodiments, the optimizer system 102 further includes a storage device, such as the internal account repository 110, that comprises a distinct component from other components of the optimizer system 102. The internal account repository 110 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). Internal account repository 110 may host the software executed to operate the optimizer system 102. Internal account repository 110 may store information relied upon during operation of the optimizer system 102, such as various beneficiary account data that may be used by the optimizer system 102, data and documents to be analyzed using the optimizer system 102, or the like. In addition, internal account repository 110 may store control signals, device characteristics, and access credentials enabling interaction between the optimizer system 102 and one or more of the client devices 106A-106N or third-party devices 108A-108N. In some embodiments, the internal account repository 110 may be configured to store both public and private account data, including transaction data, for one or more user accounts for users associated with the optimizer system 102.

In some embodiments, the optimizer system 102 may be communicatively coupled to storage device, such as the shared account repository 112. The shared account repository 112 may additionally be communicatively coupled to third-party devices 108A-108N, which may each be associated with a respective third-party entity (e.g., financial institutions). The shared account repository 112 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). Shared account repository 112 may store information relied upon during operation of the optimizer system 102, such as various beneficiary account data that may be used by the optimizer system 102, data and documents to be analyzed using the optimizer system 102, or the like. In addition, shared account repository 112 may store control signals, device characteristics, and access credentials enabling interaction between the optimizer system 102 and one or more of the client devices 106A-106N or third-party devices 108A-108N. In some embodiments, the shared account repository 112 may be configured to store public account data for one or more user accounts for users associated with the optimizer system 102 and/or users associated with third-party devices 108A-108N.

The one or more user devices 106A-106N and the one or more third-party devices 108A-108N may be embodied by any computing devices known in the art. The one or more user devices 106A-106N and the one or more third-party devices 108A-108N need not themselves be independent devices, but may be peripheral devices communicatively coupled to other computing devices. In some examples, the one or more third-party devices 108A-108N may be associated with a particular third-party entity. In some embodiments, a third-party entity may participate in a program in which select data is shared amongst other third-party entity participants and/or a financial institution associated with the optimizer system 102. The select shared data may be maintained and/or stored in the shared account repository 112.

Example Implementing Apparatuses

Figure 2:
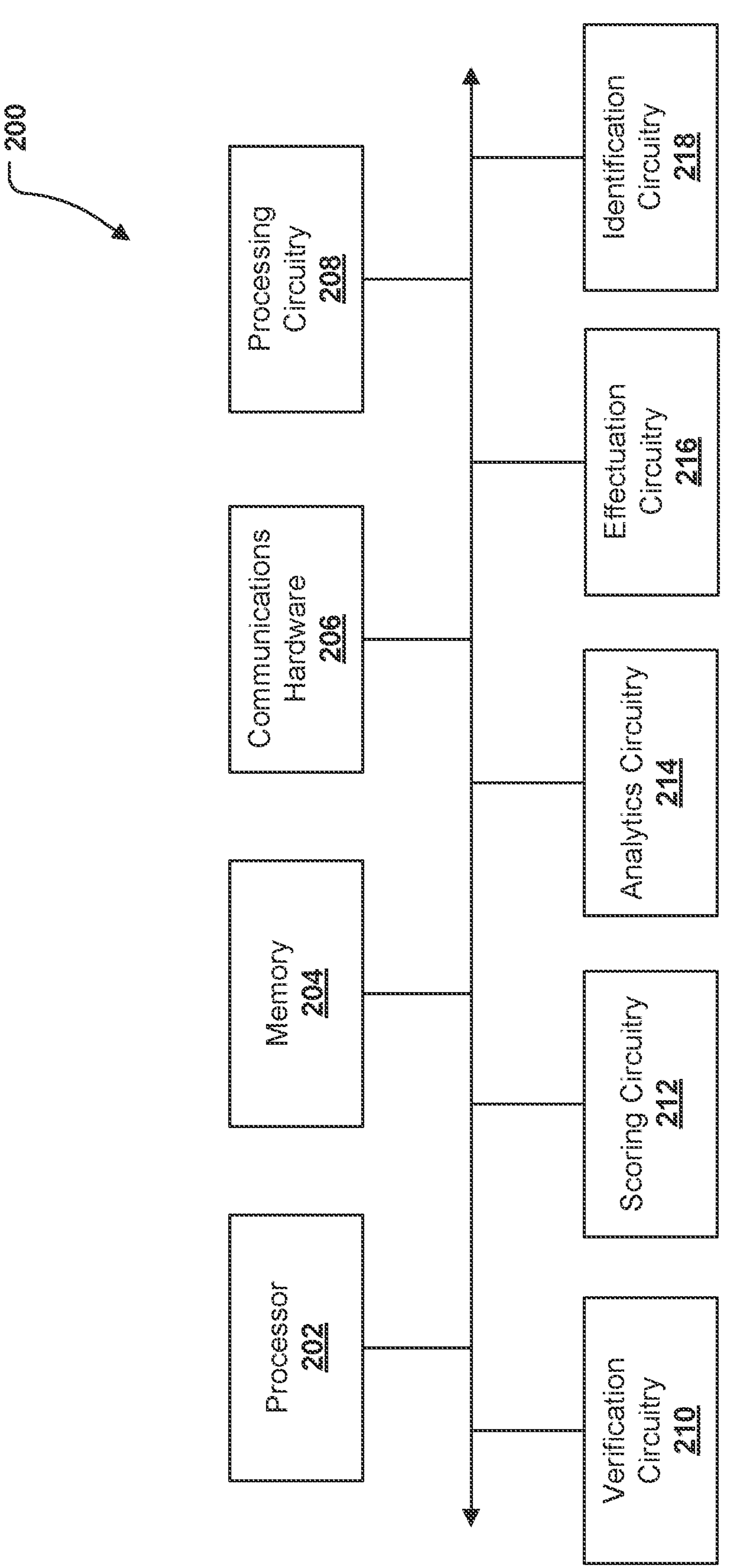
FIG. 2 illustrates a schematic block diagram of example circuitry embodying a system device that may perform various operations in accordance with some example embodiments described herein.

The optimizer system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-16. As illustrated in FIG. 2, the apparatus 200 may include processor 202, memory 204, communications hardware 206, processing circuitry 208, verification circuitry 210, scoring circuitry 212, analytics circuitry 214, effectuation circuitry 216, and/or identification circuitry, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In some embodiments, the communications hardware 206 may be configured to receive an inquiry request, provide a beneficiary optimization response, receive a transaction request, provide a beneficiary optimization response, and/or receive an authorization response. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises processing circuitry 208 that may be configured to identify a beneficiary account for a beneficiary of interest, determine at least one process to be performed for the inquiry data from one or more candidate processes, and generate a beneficiary feedback response. In some embodiments, the processing circuitry 208 may further be configured to identify an account number inquiry data value for an account number inquiry data field, a routing number inquiry data value for a routing number inquiry data field, determine whether at least one of the account number inquiry data value or the routing number inquiry data value is indicative of an internal account number, identify the beneficiary account from an internal account repository in an instance in which at least one of at least one of the account number inquiry data value or the routing number inquiry data value is indicative of an internal account number, and identify the beneficiary account from a shared account repository in an instance in which neither the account number inquiry data value nor the routing number inquiry data value is indicative of an internal account number. The processing circuitry 208 may utilize processor 202, memory 204, or any other hardware component included in the apparatus 200 to perform these operations, as described in connection with FIGS. 3-16 below. The processing circuitry 208 may further utilize communications hardware 206 to gather data from a variety of sources (e.g., user device 110A through user device 110N, third-party device 108A through third-party device 108N, internal account repository 110, and/or shared account repository 112, as shown in FIG. 1), and/or exchange data with a user.

In addition, the apparatus 200 further comprises verification circuitry 210 that may be configured to perform a set of operations associated with a verification process to generate a verification response. In some embodiments, the verification circuitry 210 may further be configured to identify one or more inquiry data values from the inquiry data for one or more inquiry data fields of interest. The verification circuitry 210 may further be configured to perform the following operations for each identified inquiry data value of the one or more inquiry data values: identify a stored data value from the identified beneficiary account, determine whether the identified stored data value and identified inquiry data value are an exact match, determine a similarity score for the identified inquiry data value, determine whether the similarity score satisfies a similarity score threshold, determine whether the identified inquiry data value is valid, and generate an inquiry data field verification response for an inquiry data field corresponding to the identified inquiry data value. The verification circuitry 210 may utilize processor 202, memory 204, or any other hardware component included in the apparatus 200 to perform these operations, as described in connection with FIGS. 3-16 below. The verification circuitry 210 may further utilize communications hardware 206 to gather data from a variety of sources (e.g., user device 110A through user device 110N, third-party device 108A through third-party device 108N, internal account repository 110, and/or shared account repository 112, as shown in FIG. 1), and/or exchange data with a user.

In addition, the apparatus 200 further comprises scoring circuitry 212 that may be configured to perform a set of operations associated with a scoring process to generate a scoring response. In some embodiments, the scoring circuitry 212 may further be configured to perform the following operations for each scored payment type of one or more scored payment types of interest: identify beneficiary account data from a beneficiary account associated with a respective scored payment type, calculate one or more insight scores for the scored payment type, determine whether the one or more insight scores satisfy a payment count threshold associated with a corresponding payment type, calculate one or more return metrics for the score payment type, and generate a payment type scoring response for the scored payment type. The scoring circuitry 212 may utilize processor 202, memory 204, or any other hardware component included in the apparatus 200 to perform these operations, as described in connection with FIGS. 3-16 below. The scoring circuitry 212 may further utilize communications hardware 206 to gather data from a variety of sources (e.g., user device 110A through user device 110N, third-party device 108A through third-party device 108N, internal account repository 110, and/or shared account repository 112, as shown in FIG. 1), and/or exchange data with a user.

In addition, the apparatus 200 further comprises analytics circuitry 214 that may be configured to perform a set of operations associated with an analytics process to generate an analytics response. In some embodiments, the analytics circuitry 214 may further be configured to perform the following operations for each analytic payment type of one or more analytic payment types of interest: identify beneficiary account data from a beneficiary account associated with a respective analytic payment type, determine whether the beneficiary account data is indicative of a successful historical transaction of the analytic payment type that has occurred within a predefined time period, and generate a payment type analytics response for the analytic payment type. The analytics circuitry 214 may utilize processor 202, memory 204, or any other hardware component included in the apparatus 200 to perform these operations, as described in connection with FIGS. 3-16 below. The analytics circuitry 214 may further utilize communications hardware 206 to gather data from a variety of sources (e.g., user device 110A through user device 110N, third-party device 108A through third-party device 108N, internal account repository 110, and/or shared account repository 112, as shown in FIG. 1), and/or exchange data with a user.

In addition, the apparatus 200 further comprises effectuation circuitry 216 that may be configured to determine whether (i) the verification response satisfies one or more verification response thresholds, (ii) the scoring response satisfies one or more scoring response thresholds, or (iii) the analytics response satisfies one or more analytic response thresholds and in an instance in which the verification response satisfies one or more verification response thresholds, the scoring response satisfies one or more scoring response thresholds, or the analytics response satisfies one or more analytic response thresholds, effectuating, by the effectuation circuitry, a transaction associated with the transaction request. In some embodiments, the effectuation circuitry 216 may be configured to effectuate a transaction associated with a transaction request. The effectuation circuitry 216 may utilize processor 202, memory 204, or any other hardware component included in the apparatus 200 to perform these operations, as described in connection with FIGS. 3-16 below. The effectuation circuitry 216 may further utilize communications hardware 206 to gather data from a variety of sources (e.g., user device 110A through user device 110N, third-party device 108A through third-party device 108N, internal account repository 110, and/or shared account repository 112, as shown in FIG. 1), and/or exchange data with a user.

In addition, the apparatus 200 further comprises identification circuitry 218 that may be configured to identify a transaction request, determine one or more candidate enhanced alternative payment types, identify a beneficiary account, determine a payment metric set for each candidate enhanced alternative payment type, generate a payment type score for each candidate alternative payment type and the payment type corresponding to the transaction request, select one or more enhanced alternative payment types, and generate a beneficiary response. The identification circuitry 218 may utilize processor 202, memory 204, or any other hardware component included in the apparatus 200 to perform these operations, as described in connection with FIGS. 3-16 below. The identification circuitry 218 may further utilize communications hardware 206 to gather data from a variety of sources (e.g., user device 110A through user device 110N, third-party device 108A through third-party device 108N, internal account repository 110, and/or shared account repository 112, as shown in FIG. 1), and/or exchange data with a user.

Although components 202-218 are described in part using functional language, it will be understood that the particular implementations necessarily include the use of particular hardware. It should also be understood that certain of these components 202-218 may include similar or common hardware. For example, the processing circuitry 208, the verification circuitry 210, the scoring circuitry 212, analytics circuitry 214, effectuation circuitry 216, and/or identification circuitry 218 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the processing circuitry 208, the verification circuitry 210, the scoring circuitry 212, analytics circuitry 214, effectuation circuitry 216, and identification circuitry 218 may leverage processor 202, memory 204, or communications hardware 206 as described above, it will be understood that any of processing circuitry 208, the verification circuitry 210, the scoring circuitry 212, analytics circuitry 214, effectuation circuitry 216, and/or identification circuitry 218 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that processing circuitry 208, the verification circuitry 210, the scoring circuitry 212, analytics circuitry 214, effectuation circuitry 216, and/or identification circuitry 218 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of graphical user interfaces, operational examples, and flowcharts.

Example Operations

Turning to FIGS. 3-7 and 9-10, example flowcharts are illustrated that contain example operations implemented by example embodiments described herein. The operations illustrated in FIGS. 3-7 and 9-10 may, for example, be performed by a system device of the optimizer system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, processing circuitry 208, the verification circuitry 210, the scoring circuitry 212, analytics circuitry 214, effectuation circuitry 216, identification circuitry 218, and/or any combination thereof. It will be understood that user interaction with the optimizer system 102 may occur directly via communications hardware 206, or may instead be facilitated by a separate client device (e.g., any one of client devices 106A-106N) and/or a separate third-party device (e.g., any one of third-party devices 108A-108N), as shown in FIG. 1, and which may have similar or equivalent physical componentry facilitating such user interaction.

Generation and Provision of a Beneficiary Feedback Response

Figure 3:
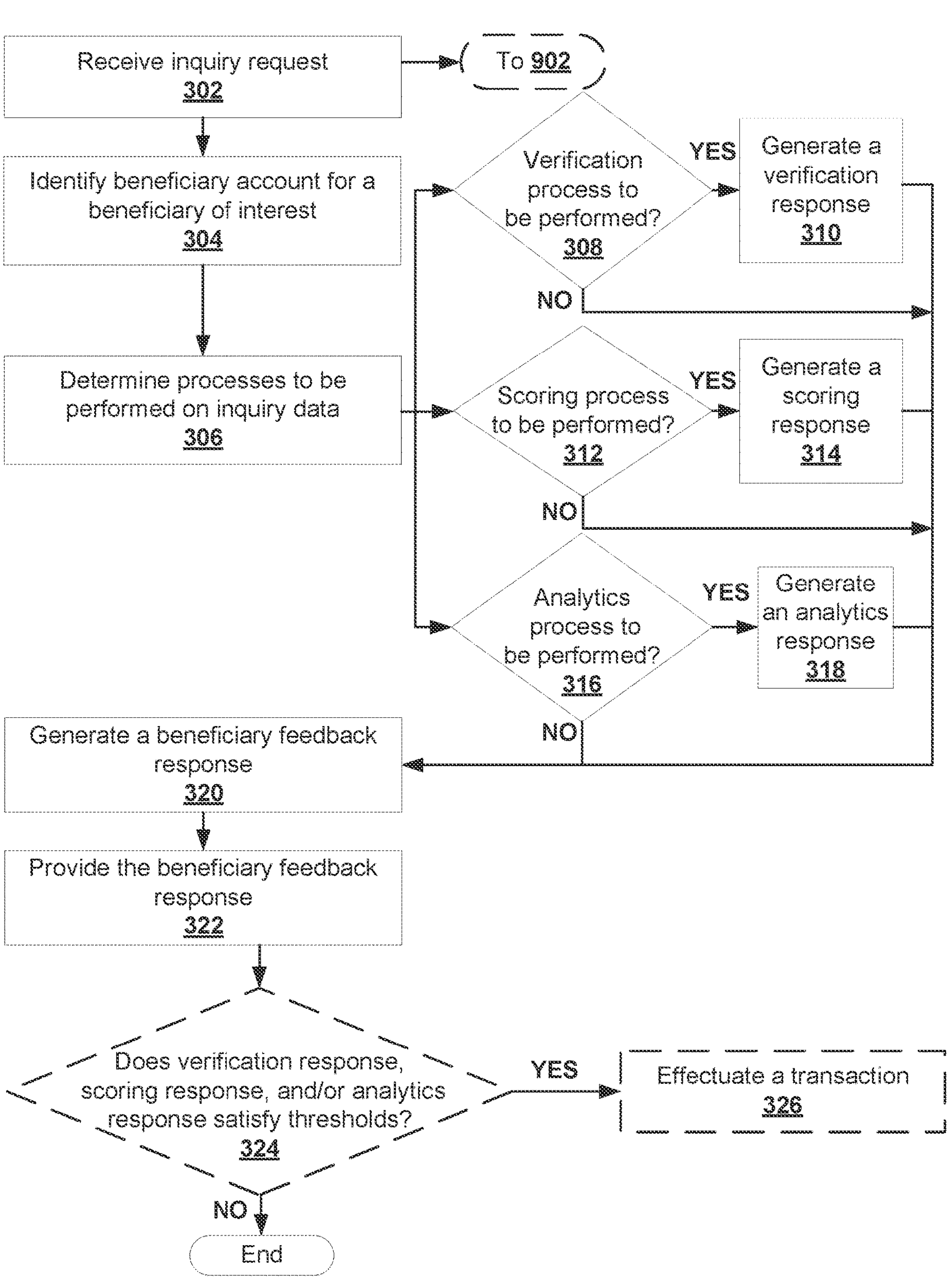
FIG. 3 illustrates an example flowchart for generating a beneficiary feedback response, in accordance with some example embodiments described herein.

Turning first to FIG. 3, example operations are shown for generating a beneficiary feedback response. In some embodiments, a requesting entity may provide apparatus 200 with an inquiry request that includes inquiry data and, in some embodiments, includes a transaction request. The inquiry data may identify a beneficiary of interest, such as a beneficiary the requesting entity wishes to transact with. As described above, conventionally, the requesting entity lacks insight into the particular beneficiary accounts, behaviors, etc., particularly if this beneficiary was previously unknown to the requesting entity. As such, the requesting entity may be wary of an unknown fraud risk associated with the particular beneficiary and therefore, may be hesitant to initiate and/or proceed with communications or transactions with said beneficiary. This may negatively affect both the requesting entity and beneficiary, as each may miss out of mutual benefits of such communications and/or transactions. However, the apparatus 200 may generate and provide a beneficiary feedback response for the requesting entity indicative of an analysis performed on accounts associated with the beneficiary of interest such that the requesting entity gain further insight into the beneficiary and may tailor a communication style and/or transaction style based on the beneficiary feedback response.

The beneficiary feedback response may include a verification response, a scoring response, and/or an analytics response that are each indicative of an accuracy or validity of provided beneficiary information included in the inquiry request as well as an indication of a trustworthiness of the beneficiary regarding certain payment types, as will be discussed in further detail below. The apparatus 200 may leverage account data stored within a shared account repository that includes limited account data for users associated with the financial institution associated with apparatus 200 and a financial institution that participates in a data sharing program (e.g., data is shared by any one or more of third-party devices 108A-108N). Additionally, apparatus 200 may leverage account data stored within an internal account repository that includes private account data, including historical transaction data, for users associated with the financial institution associated with apparatus 200. By leveraging both publicly shared account data and private internal account data, the apparatus 200 may perform a robust analysis of beneficiary accounts to generate a comprehensive beneficiary feedback response.

As shown by operation 302, the apparatus 200 includes means, such as processor 202, memory 204, communications hardware 206, or the like, for receiving an inquiry request. An inquiry request may be received from a requesting entity, which may be an individual user, a commercial organization, a non-profit organization, an organization of users, or the like. The inquiry request may be received from any device associated with the requesting entity, such as any one of client devices 106A-106N. In some embodiments, the requesting entity may be affiliated with the financial institution that is associated with apparatus 200. For example, in some embodiments, the inquiry request may be received from a customer of the financial institution (e.g. the requesting entity).

In some embodiments, the inquiry request may include inquiry data. The inquiry data may be indicative of information regarding a beneficiary of interest such that the apparatus 200 may identify the beneficiary of interest and one or more beneficiary accounts associated with the beneficiary of interest. In particular, the inquiry data may include one or more inquiry data field and one or more inquiry data values. Each inquiry data value may correspond to a particular inquiry data field. For example, inquiry data fields may include a first name, a last name, a business name, a middle name, a beneficiary address, a phone number, an email address, a physical address (e.g., address line 1, address line 2, city, state, postal code, country), a date of birth, a social security number, a taxpayer identification number, a death indicator (e.g., indicative of whether the beneficiary is alive or deceased), a bank identifier code, an account number, beneficiary payment preferences, and/or the like and the one or more inquiry data values of the inquiry data may provide beneficiary information as provided by the requesting entity for the one or more inquiry data fields. The inquiry data may therefore be indicative of collected or stored information that the requesting entity has for the beneficiary of interest. As such, it will be appreciated that one or more inquiry data fields may not be populated with a corresponding inquiry data value due to the requesting entity lacking this information for the beneficiary of interest.

In some embodiments, the inquiry request further includes a transaction request. The transaction request may include a requested transaction, a transaction amount, and a recipient of the transaction, which may each be inquiry data fields. In some embodiments, the recipient of the transaction is the beneficiary of interest. The transaction request may further include a payment type for the transaction of the transaction request. For example, a payment type may include an automated clearing house payment type, a wire transfer payment type, an electronic check payment type, a peer-to-peer transfer payment type, an automated teller machine payment type, a point-of-sale payment type, or a cryptocurrency payment type.

In some embodiments, the inquiry request may further include an indication of one or more selected processes which are selected by the requesting entity for the particular inquiry request. Available processes may include a verification process, a scoring process, and/or an analytics process. In some embodiments, the requesting entity may provide an indication for a selection for each of the one or more processes to be performed on the beneficiary of interest such that the one or more processes to be performed may be determined directly from the inquiry request. Additionally, or alternatively, the inquiry data may include inquiry data values for inquiry data fields such as a requesting entity account number, a requesting entity identifier, a requesting entity username, a requesting entity email address, and/or the like. As such, the identity of the requesting entity may be determined and, in some embodiments, used to determine a default process configuration for the requesting entity that may ultimately be used to determine which processes to perform on the inquiry data, as will be discussed in further detail in operation 306.

As shown by operation 304, the apparatus 200 includes means, such as processor 202, memory 204, communications hardware 206, processing circuitry 208, or the like, for identifying a beneficiary account for a beneficiary of interest. Once the inquiry request has been received, the processing circuitry 208 may process and/or analyze the inquiry request to identify a beneficiary account for the beneficiary on interest. As described above, the inquiry request may include one or more inquiry data values which each correspond to an inquiry data field such that the inquiry data field is a structured data object. Thus, the processing circuitry 208 may identify the one or more beneficiary accounts based on one or more inquiry data values that correspond to inquiry data fields indicative of a beneficiary account. Alternatively, in some embodiments, the processing circuitry 208 may utilize any suitable processing technique, such as optical character recognition (OCR), natural language processing (NLP) techniques, and/or the like to process the inquiry request and/or associated inquiry data values to identify the one or more beneficiary accounts.

In some embodiments, the processing circuitry 208 may further identify one or more inquiry data values of inquiry data fields associated with a beneficiary account. The one or more identified inquiry data values may be used to identify a beneficiary account. For example, an inquiry data field may include a routing number inquiry data field, an account number inquiry data field, a phone number inquiry data field, an email inquiry data field, a username inquiry data field, and/or the like. The processing circuitry 208 may use the identified inquiry data values to query an internal account repository and/or shared account repository for a beneficiary account. In an instance in which the processing circuitry 208 determines an account that includes stored data values which match one or more of the inquiry data values for the inquiry data fields, the processing circuitry 208 may identify the account as a beneficiary account.

In some embodiments, the inquiry data value for this inquiry data field may be indicative of a corresponding entity, such as a financial institution, with which a beneficiary account is associated. In some embodiments, a routing number data value corresponding to a routing number inquiry data field may be an American Bankers Association (ABA) routing number or a bank identifier code (BIC) (also known as a Society for Worldwide Interbank Financial Telecommunications (SWIFT) code). The identified beneficiary account may be an internal account associated with the financial institution with which apparatus 200 is associated or may be a shared account associated with an external/third-party financial entity.

In some embodiments, a beneficiary account, in the internal account repository and/or shared account repository, may include a user preference profile. The user preference profile may be configured by the entity (e.g., the beneficiary) to allow entity preferences to be communicated to other entities. The user preference profile may be indicative of one or more payment types preferred by the user to facilitate payment. The user preference profile may indicate payment type preferences for a user when acting as a payer and when acting as a payee/beneficiary. For example, the user preference profile may indicate the user prefers to be paid with wire transfers and prefers pay with ACH payments. In some embodiments, the user preference profile may be indicative of payment methods preferred by the user subject to a set of rules and/or conditions. For example, a user preference profile may indicate the user prefers to be pay with ACH payments but only for transaction amounts under $10,000. The payment type preferences may correspond to stored data values associated with a payment preference data field that may be identified from the beneficiary account and used for the verification process, as described in further detail in operation 310 and FIG. 5.

Figure 4:
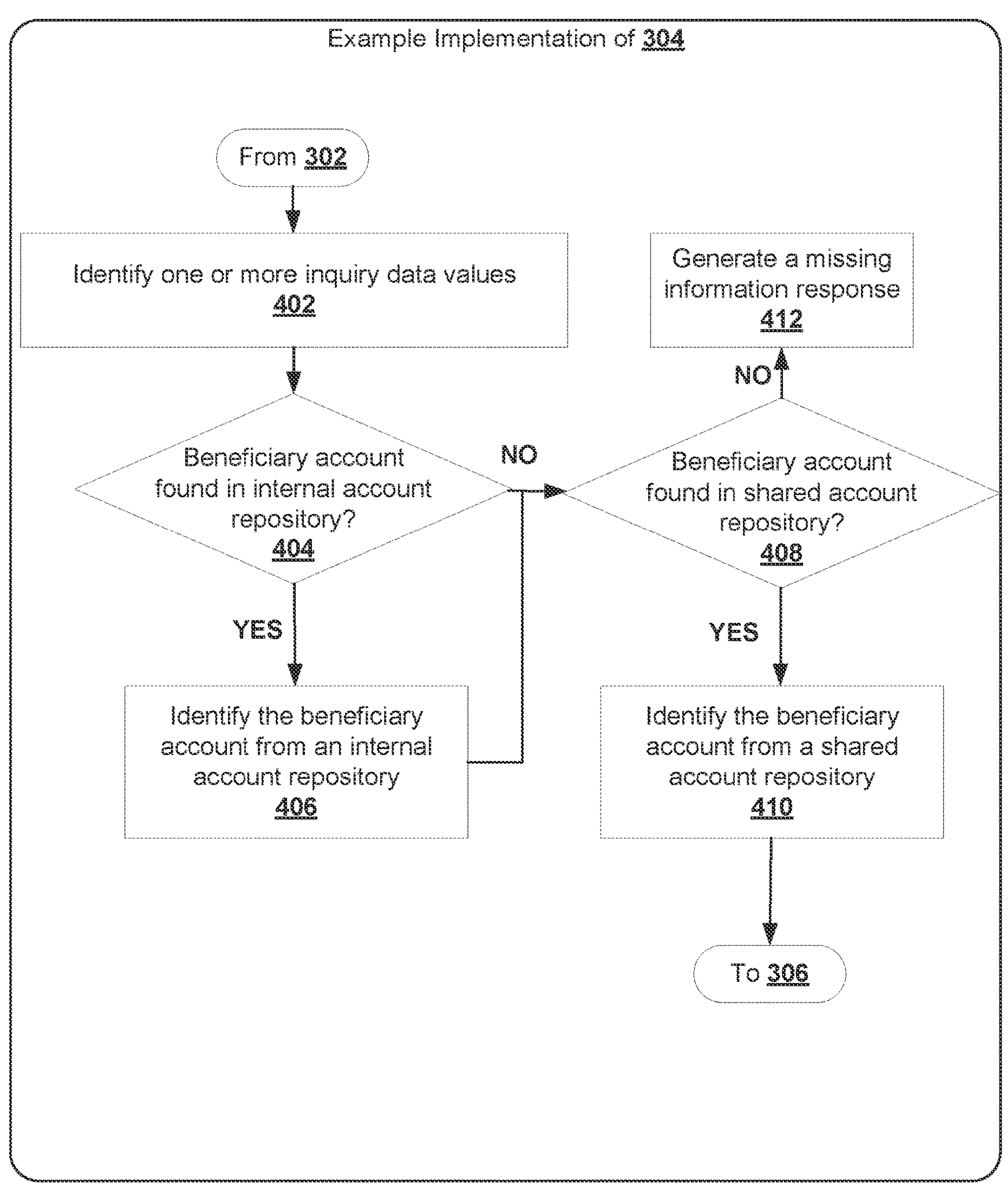
FIG. 4 illustrates an example flowchart for identifying a beneficiary account for a beneficiary of interest, in accordance with some example embodiments described herein.

In some embodiments, operation 304 may be performed in accordance with the operations described by FIG. 4. Turning now to FIG. 4, example operations are shown for identifying a beneficiary account. In particular, the operations of FIG. 4 illustrate that a beneficiary account may be identified for a beneficiary of interest using an internal account repository and/or using a shared account repository.

As shown by operation 402, the apparatus 200 includes means, such as processor 202, memory 204, communications hardware 206, processing circuitry 208, or the like, for identifying one or more inquiry data values. As described above, the one or more inquiry data values may be indicative of a beneficiary account. For example, an inquiry data value may include a routing number inquiry data field, an account number inquiry data field, a phone number inquiry data field, an email inquiry data field, a username inquiry data field, and/or the like. As described above, the processing circuitry 208 may identify the one or more beneficiary accounts based on the inquiry data values by querying the internal account repository and/or shared account repository for one or more accounts that include the identified inquiry data values.

In some embodiments, prior to querying the internal account repository 110 and/or shared account repository 112, the processing circuitry 208 may determine whether the one or more inquiry data values are indicative of a beneficiary account in an internal account repository 110 and/or a shared account repository 112. In particular, the inquiry data values may processing circuitry 208 may identify one or more inquiry data values that are indicative of the financial institution a beneficiary is associated with. For example a routing number inquiry data value may be indicative of an ABA routing number or a BIC/SWIFT code that may uniquely identify a financial institution that is associated with a particular beneficiary account. As such, the processing circuitry 208 may identify which account repository (e.g., the internal account repository 110 or the shared account repository 112) to query based on the financial institution. Thus, in some embodiments the processing circuitry 208 may be configured to determine an associated internal routing number for the financial institution, such as by identifying an internal routing number for the financial institution from a memory, such as memory 204.

In some embodiments, the processing circuitry 208 may determine which internal routing number to select based on a type of routing number identified for a corresponding account number inquiry data value. For example, both the ABA routing number and BIC/SWIFT code may be associated with a particular structure such that the type of routing number for a routing number inquiry data value may be determined by the processing circuitry 208. By way of particular example, an ABA routing number inquiry data value may be a sequence of nine numeric characters while a BIC/SWIFT code may be a sequence of eight through eleven alphanumeric characters. Thus, the processing circuitry 208 may be configured to select a same type of internal routing number as the routing number inquiry data value to enable a valid comparison between the routing numbers.

The processing circuitry 208 may determine whether the identified routing number inquiry data value is an exact match to the identified internal routing number. In an instance in which the identified routing number inquiry data value is an exact match to the identified internal routing number, the processing circuitry 208 may determine the routing number inquiry data value is indicative of an internal account number. Alternatively, in an instance in which the identified routing number inquiry data value differs from the identified internal routing number, the processing circuitry 208 may determine the routing number is not indicative of an internal account number.

In some embodiments, the processing circuitry 208 may determine whether the account number inquiry data value is indicative of an internal account number. In some embodiments, the processing circuitry 208 may be configured to determine whether the account number inquiry data value is formatted in accordance with a set of account number configuration rules associated with the financial institution. For example, a set of account number configuration rules may be indicative of a particular account number length and/or other rules that internal account numbers for the financial institution must follow. By way of particular example, the set of account number configuration rules may require that all account numbers for the financial institution are 12 digits in length and must have either a "2" or "3" digit as the second character. As such, the processing circuitry 208 may determine whether the account number inquiry data value is in accordance with the set of account number configuration rules. In an instance in which the account number inquiry data value is in accordance with the set of account number configuration rules, the processing circuitry 208 may determine the account number inquiry data value is indicative of an internal account number. In an instance in which the account number inquiry data value deviates from the set of account number configuration rules, the processing circuitry 208 may determine the account number inquiry data value is not indicative of an internal account number.

By first leveraging the account number configuration rules and/or the identified internal routing number, processing circuitry 208 may improve account identification efficiency by avoiding agnostically querying an internal account database, such as internal account repository 110, for a possible beneficiary account and instead, first performs low cost comparisons to confirm the possibility of an existence of an internal account number for the beneficiary. As such, this method of account identification for a beneficiary account improves computational efficiency by reducing the overall computational resource cost devoted to identification of a beneficiary account.

In some embodiments, the financial institution associated with apparatus 200 may be affiliated with one or more third-party/external financial entities, which may participate in a program where certain, limited account information is shared amongst program participants. This shared account information may be stored in a shared account storage, such as shared account repository 112. The shared account repository may be accessible to each program participant, such that apparatus 200 may access the shared account repository and determine certain beneficiary account information for a beneficiary account which is associated with a different program participant (e.g., a third-party/external financial entity associated with any one or more of third-party devices 108A-108N). In some embodiments, a list of each program participant as well as respective participant routing numbers (e.g., a shared account number) and/or account number configuration rules may be stored in an associated storage, such as the shared account repository 112 and/or memory 204. Thus, processing circuitry 208 may also determine whether the account number inquiry data value and/or routing number inquiry data value are indicative of a shared account number.

As shown by operation 404, the apparatus 200 includes means, such as processor 202, memory 204, communications hardware 206, processing circuitry 208, or the like, for determining whether a beneficiary account is identified within the internal account repository 110. In some embodiments, the processing circuitry 208 may use the one or more inquiry data values to query the internal account repository 110 for a beneficiary account. In particular, the processing circuitry 208 may query the internal account repository 110 using the one or more identified inquiry data values. In an instance a beneficiary account includes stored data values which match one or more of the inquiry data values for the inquiry data fields, the processing circuitry 208 may identify the account as a beneficiary account. In some embodiments, operation 404 may be performed in an instance in which an account number inquiry data value and/or routing number inquiry data value are determined to be indicative of an internal account number, as described above.

By leveraging the account number configuration rules and/or the shared routing number for third-party entities which share select account information via the shared account repository 112, processing circuitry 208 may similarly improve account identification efficiency by avoiding agnostically querying the shared account repository 112 for a possible beneficiary account and again performs low cost comparisons to confirm the possibility of an existence of a shared account number for the beneficiary. Additionally, by first identifying the particular third-party/external financial entity associated with the beneficiary account, the processing circuitry 208 may limit its query to only certain locations within the shared account repository 112 which are associated with the particular third-party/external financial entity, thus further improving computational efficiency by reducing the overall computational resource cost devoted to querying the entirety of the shared account repository 112.

In an instance in which a beneficiary account is found in the internal account repository, the process proceeds to operation 406. As shown by operation 406 the apparatus 200 includes means, such as processor 202, memory 204, communications hardware 206, processing circuitry 208, or the like, for identifying the beneficiary account from an internal account repository. In particular, the processing circuitry 208 may identify the beneficiary account for the beneficiary of interest based on the results of the query of the internal account repository 110. The results of the query may return beneficiary account information corresponding to a beneficiary account that is maintained by the financial institution. In some embodiments, beneficiary account information obtained from the internal account repository 110 may include beneficiary account details such as an account balance, an account age, a last access of the account, and/or the like as well as beneficiary information (e.g., first name, a last name, a middle name, a beneficiary address, a phone number, an email address, a business name, a physical address (e.g., address line 1, address line 2, city, state, postal code, country), a phone number, an email address, a date of birth, a social security number, a taxpayer identification number, a death indicator (e.g., indicative of whether the beneficiary is alive or deceased, etc. of the beneficiary), beneficiary payment preferences, etc. The beneficiary account details may further include historical transactions and historical transaction details (e.g., payer/payee information, payment type information, payment amount information, an indication of whether the transaction was successful, etc.) associated with the beneficiary account.

As shown by operation 408, the apparatus 200 includes means, such as processor 202, memory 204, communications hardware 206, processing circuitry 208, or the like, for determining whether a beneficiary account is identified within the shared account repository. In some embodiments, the processing circuitry 208 may use the one or more inquiry data values to query the shared account repository 112 for a beneficiary account. In particular, the processing circuitry 208 may query the shared account repository 112 using the one or more identified inquiry data values. In an instance a beneficiary account includes stored data values which match one or more of the inquiry data values for the inquiry data fields, the processing circuitry 208 may identify the account as a beneficiary account. In some embodiments, operation 408 may be performed in an instance in which an account number inquiry data value and/or routing number inquiry data value are determined to be indicative of a shared account number, as described above.

In an instance in which a beneficiary account is found in the shared account repository 112, the process proceeds to operation 410. As shown by operation 410 the apparatus 200 includes means, such as processor 202, memory 204, communications hardware 206, processing circuitry 208, or the like, for identifying the beneficiary account from a shared account repository. The processing circuitry 208 may then identify the beneficiary account for the beneficiary of interest based on the results of the query of the shared account repository 112. The results of the query may return beneficiary account information corresponding to a beneficiary account that is provided by a respective third-party/external financial entity. In some embodiments, beneficiary account information obtained from the shared account repository 112 may include limited beneficiary account details such as an account balance, an account age, a last access of the account as well as beneficiary information (e.g., first name, a last name, a middle name, a beneficiary address, a phone number, an email address, a business name, a physical address (e.g., address line 1, address line 2, city, state, postal code, country), a phone number, an email address, a date of birth, a social security number, a taxpayer identification number, a death indicator (e.g., indicative of whether the beneficiary is alive or deceased), beneficiary payment preferences, etc. of the beneficiary).

In an instance in which a beneficiary account is not found in either the internal account repository 110 and/or the shared account repository 112, the process proceeds to operation 412. As shown by operation 412 the apparatus 200 includes means, such as processor 202, memory 204, communications hardware 206, processing circuitry 208, or the like, for generating a missing information response. In an instance in which the a beneficiary account cannot be found in either data repository, the processing circuitry 208 may generate a missing information response which may indicate that the provided inquiry data values do not correspond to an eligible beneficiary account. This may occur due to an error (e.g., a typo) within one or more inquiry data values or may be due a beneficiary account being associated with a third-party/external entity that is not currently affiliated with an eligible program such that account information maintained by this third-party is not available within the shared account repository 112. The missing information response may later be included in the beneficiary optimization response such that the requesting entity is made aware that this information is unavailable based on the provided inquiry information.

Returning now to FIG. 3, as shown by operation 306, the apparatus 200 includes means, such as processor 202, memory 204, communications hardware 206, processing circuitry 208, or the like, for determining at least one process of one or more candidate processes to be performed on the inquiry data. In particular, the processing circuitry 208 may determine at least one process to be performed on the inquiry data from one or more candidate processes. The one or more candidate processes may include a verification process, a scoring process, and/or an analytics process.

In some embodiments, processing circuitry 208 may determine the processes to be performed on the inquiry data based on inquiry request. The inquiry request may further include an indication of one or more selected processes which are selected by the requesting entity for the particular inquiry request. Available processes may include a verification process, a scoring process, and/or an analytics process. In some embodiments, the requesting entity may provide an indication for a selection for each of the one or more processes to be performed on the beneficiary of interest in the inquiry request such that the one or more processes to be performed may be determined directly from the inquiry request. For example, a requesting entity may interact with (e.g., click, select, touch, etc.) one or more process selections while during the generation of the inquiry request and these selections may be reflected in the inquiry request. As such, the processing circuitry 208 may determine whether a verification process, a scoring process, and/or an analytics process is to be performed on the inquiry data based on the inquiry request.

Additionally, or alternatively, the inquiry data may include inquiry data values for inquiry data fields such as a requesting entity account number, a requesting entity identifier, a requesting entity username, a requesting entity email address, and/or the like. The processing circuitry 208 may then be configured to identify the one or more inquiry data values indicative of a requesting entity identity. The processing circuitry 208 may then determine the one or more processes to be performed based on a stored default process configuration associated with the requesting entity. For example, a requesting entity may be enrolled in a particular program that automatically causes inquiry requests to be received by apparatus 200 on behalf of the requesting entity, such as in an instance in which the requesting entity provides a transaction request. During registration in the program, the requesting entity may be required to select a one or more default processes to be performed on inquiry data. These selected default processes may be stored in an associated storage, such as in internal account repository 110 and/or memory 204, as a default process configuration and this default process configuration may be further associated with a particular entity identifier. As such, the processing circuitry 208 may be configured to determine the one or more processes to be performed by performing a query or lookup function for the entity identifier within the associated memory to identify the default process configuration for the requesting entity.

In some embodiments, the processes described by the default process configuration may differ from the processes described by the inquiry request. For example, a default process configuration may only include a verification process and scoring process selection but a received inquiry request may include a verification process, a scoring process, and an analytics process. In some embodiments, the processing circuitry 208 may be configured to determine any additional processes that differ between the default process configuration and the inquiry request. By way of continuing example, the processing circuitry 208 may determine to perform the verification process, the scoring process, and the analytics process due to the inclusion of the analytical process in the inquiry request. In some embodiments, in an instance in which the processes indicated in the inquiry request differs from the default process configuration, the processing circuitry 208 may cause the communications hardware 206 to provide an indication of this discrepancy to an associated client device (e.g., any one of client devices 106A-106N) of the requesting user and/or any relevant information associated with the additional process, such as additional costs for the process and/or an overview of what the process includes. The requesting user may then confirm whether he/she would like to proceed with the additional process and the processing circuitry 208 may determine the one or more processes to be performed based on this additional input.

As shown by operation 308, the apparatus 200 includes means, such as processor 202, memory 204, communications hardware 206, processing circuitry 208, or the like, for determining whether a verification process is to be performed. As described in operation 306, the processing circuitry 208 may determine which processes are to be performed on the inquiry data. In an instance in which the inquiry request and/or default process configuration is indicative of an affirmative selection for a verification process, the processing circuitry 208 may determine to perform a verification process. A verification process may be associated with a set of operations that may be performed to generate a verification response. In some embodiments, the set of operations associated with the verification process includes comparing one or more inquiry data values to one or more corresponding stored data values associated with the identified beneficiary account. The one or more corresponding stored data values may be associated with a data field that corresponds to the inquiry data field of a compared inquiry data value. The stored data values may be obtained from either the internal account repository 110 in an instance in which the beneficiary account corresponds to an internal account and internal account number or may be obtained from the shared account repository 112 in an instance in which the beneficiary account corresponds to a shared account and shared account number.

In an instance in which a verification process is determined to be performed, as determined in operation 306, the process proceeds to operation 310. As shown by operation 310, the apparatus 200 includes means, such as processor 202, memory 204, communications hardware 206, verification circuitry 210, or the like, for generating a verification response. As described above, verification circuitry 210 may perform a verification process to generate the verification response. A verification response may include one or more inquiry data field verification responses for one or more inquiry data fields which correspond to the one or more inquiry data values compared during the verification process. In some embodiments, the inquiry data field response may be indicative of an exact match, a close match, no match or may be indicative that the information is unavailable for a given inquiry data field.

As such, the verification response may provide an indication of the validity of each provided inquiry data field which is known by the requesting entity regarding the beneficiary. For example, an inquiry data field may include a full name inquiry data field and thus an inquiry data value may describe an associated name for the beneficiary which is known by the requesting entity. By way of particular example, the requesting entity may be provided with and/or store a beneficiary name as "John Smith". As such, the inquiry request may include an inquiry data value "John Smith" for the full name inquiry data field. A stored data value corresponding to a full name data field obtained from the identified beneficiary account (e.g., as obtained from either the internal account repository 110 or shared account repository 112) may be "John C. Smith". The stored data value and inquiry data value may then be compared, and an inquiry data filed response indicative of a close match may be generated for the full name inquiry data field. As such, the inquiry data field response may be indicative of an inferred validity or accuracy of a provided beneficiary name as compared to a stored beneficiary name, which has been verified for authenticity.

Figure 5:
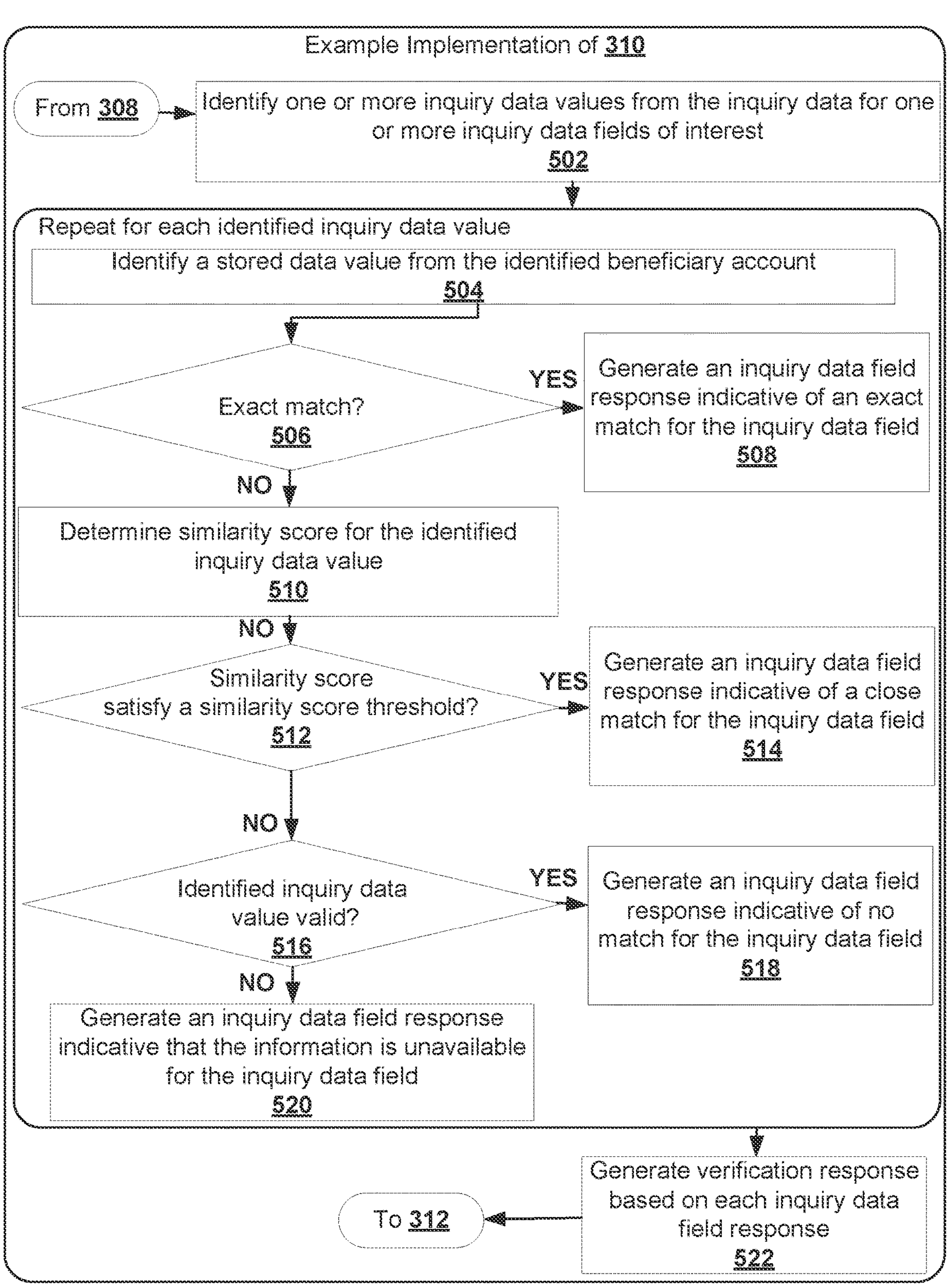
FIG. 5 illustrates an example flowchart for generating a verification response, in accordance with some example embodiments described herein.

In some embodiments, operation 310 may be performed in accordance with the operations described by FIG. 5. Turning now to FIG. 5, example operations are shown for generating a verification response.

As shown by operation 502, the apparatus 200 includes means, such as processor 202, memory 204, communications hardware 206, verification circuitry 210, or the like, for identifying one or more inquiry data values from the inquiry data for one or more inquiry data fields of interest. In some embodiments, the verification circuitry 210 may determine one or more inquiry data fields of interest and may then identify one or more corresponding inquiry data values. In some embodiments, verification circuitry 210 may identify any populated inquiry data field in the inquiry request as an inquiry data field of interest. Additionally, or alternatively, the inquiry data field may access an inquiry data field configuration set associated with the requesting entity, such as by using a requesting entity identifier (e.g., requesting entity account number, a requesting entity identifier, a requesting entity username, a requesting entity email address, and/or the like) that may be provided in the inquiry request. The inquiry data field configuration set may include one or more inquiry data fields that are selected either by default and/or by the particular requesting entity and therefore may be indicative of the one or more inquiry data fields of interest. Once the verification circuitry 210 has identified the one or more inquiry data fields of interest, the verification circuitry 210 may identify the one or more inquiry data values from the inquiry data that correspond to the one or more data fields of interest.

In some embodiments, operations 504 through 520 may be repeated for each identified inquiry data value corresponding to an inquiry data field of interest.

As shown by operation 504, the apparatus 200 includes means, such as processor 202, memory 204, communications hardware 206, verification circuitry 210, or the like, for identifying a stored data value from the identified beneficiary account. As described in FIG. 4, the stored data values may be obtained from either the internal account repository 110 in an instance in which the beneficiary account corresponds to an internal account and internal account number or may be obtained from the shared account repository 112 in an instance in which the beneficiary account corresponds to a shared account and shared account number. In either instance, a beneficiary account may include beneficiary information such as a first name, a last name, a middle name, a beneficiary address, a business name, a physical address (e.g., address line 1, address line 2, city, state, postal code, country), a phone number, an email address, a date of birth, a social security number, a taxpayer identification number, a death indicator (e.g., indicative of whether the beneficiary is alive or deceased), beneficiary payment preferences, etc. of the beneficiary.

The beneficiary information may be formatted or otherwise organized in such that stored data values within the beneficiary account may include the beneficiary account information and the stored data values may be associated with corresponding data fields. The verification circuitry 210 identifys a stored data value from the identified beneficiary account which is associated with a data field that corresponds to the inquiry data field for the current identified inquiry data value. For example, an identified inquiry data value may be "John Smith", which may be associated with a full name inquiry data field which is included in the one or more inquiry data fields of interest. The verification circuitry 210 circuitry may then identify a full name data field in the beneficiary information and subsequently identify a full name stored data value, such as "John. C. Smith".

As shown by operation 506, the apparatus 200 includes means, such as processor 202, memory 204, communications hardware 206, verification circuitry 210, or the like, for determining whether the identified stored data value and identified inquiry data value are an exact match. The verification circuitry 210 may compare the identified inquiry data value and the identified stored data value to determine whether the data values are an exact match. In some embodiments, the verification circuitry 210 may compare each character and character position in the inquiry data value to a corresponding character and character position in the stored data value to determine whether the data values are an exact match. An exact match may be determined if each character at a particular character position matches between the data values and in an instance in which a data value (e.g., the identified inquiry data value or identified stored data value) does not include extra characters.

In an instance in which the identified stored data value and identified inquiry data value are an exact match, the process proceeds to operation 508. As shown by operation 508, the apparatus 200 includes means, such as processor 202, memory 204, communications hardware 206, verification circuitry 210, or the like, for generating an inquiry data field response indicative of an exact match for the inquiry data field. In an instance in which the verification circuitry 210 determines an exact match between the inquiry data field and stored data field, the verification circuitry 210 may generate the inquiry data field response indicative of this exact match for the inquiry data field associated with the identified inquiry data value. As such, a requesting entity may be provided with confirmation that the inquiry data value for the beneficiary exactly matches a stored data value. Additionally, the verification circuitry 210 may terminate the process for the current identified inquiry data value (e.g., not perform operation 510-520) and move to the next identified inquiry data value.

In an instance in which the identified stored data value and identified inquiry data value are not an exact match, the process proceeds to operation 510. As shown by operation 510, the apparatus 200 includes means, such as processor 202, memory 204, communications hardware 206, verification circuitry 210, or the like, for determining a similarity score for the inquiry data value. The verification circuitry 210 may determine the similarity score for the inquiry data value based on a comparison between the identified inquiry data value and the identified stored data value. The similarity score may be a numerical value (e.g., a number, percentage, decimal, etc.) that is indicative of a similarity between the identified inquiry data value and the stored data value. In some embodiments, a similarity score may be generated by determining a maximum number of characters for either of the two data values (e.g., the identified inquiry data value and the identified stored data value). The verification circuitry 210 may then determine a number of characters which match between the two data values. The verification circuitry 210 may determine the similarity score based on the proportion of characters which match as compared to the maximum number of characters. By way of continuing example, the identified inquiry data value may be "John Smith" and the stored data value may be "John. C. Smith". The verification circuitry 210 may determine a maximum number of characters of ten and determine that nine characters match. As such, the verification circuitry 210 may determine a similarity score of 0.9 by dividing the number of matching characters by the maximum number of characters.

Alternatively, in some embodiments, the verification circuitry 210 may determine a similarity score for an inquiry data value using a machine learning model or other model that is configured to infer a similarity between data values. The machine learning model may be configured to determine a Euclidean distance measure or other similarity measure by processing the inquiry data value and stored data value to determine the similarity score. In some embodiments, the machine learning model may be a clustering model that is configured to use a k-nearest neighbour (KNN) algorithm, support vector machine (SVM) algorithms, k-means, and/or other statistical algorithms to determine the similarity score for the inquiry data value.

As shown by operation 512, the apparatus 200 includes means, such as processor 202, memory 204, communications hardware 206, verification circuitry 210, or the like, for determining whether the similarity score satisfies a similarity score threshold. Once the verification circuitry 210 determines the similarity score for the inquiry data value, the verification circuitry 210 may determine whether the inquiry data value satisfies a similarity score threshold. In some embodiments, the similarity score threshold may be associated with a particular inquiry data field such that the similarity score threshold may be adjusted and is flexible between different inquiry data fields. In some embodiments, the similarity score threshold for an inquiry data field may be included in the inquiry data field configuration set such that the verification circuitry 210 may determine the similarity score threshold from the inquiry data field configuration set. Alternatively, the verification circuitry 210 may be configured with a particular similarity score threshold such that a similarity score threshold for all inquiry data fields.

The verification circuitry 210 may determine whether the similarity score satisfies the verification score threshold. For example, the similarity score threshold may be 0.8 such that the similarity score for the identified inquiry data value must be 0.8 or greater to satisfy the similarity score threshold. Otherwise, the similarity score may fail to satisfy the similarity score threshold.

In an instance in which the similarity score satisfies the similarity score threshold, the process proceeds to operation 514. As shown by operation 514, the apparatus 200 includes means, such as processor 202, memory 204, communications hardware 206, verification circuitry 210, or the like, for generating an inquiry data field response indicative of a close match for the inquiry data field. In an instance in which the verification circuitry 210 determines the similarity score for the inquiry data value satisfies the similarity score threshold, the verification circuitry 210 may generate the inquiry data field response indicative of a close match for the inquiry data field associated with the identified inquiry data value. Additionally, the inquiry data field response may include the similarity score for the inquiry data value corresponding to the inquiry data field response. As such, a requesting entity may be provided with a measure of how similar a provided inquiry data value for the beneficiary was determined to be to a stored data value. The verification circuitry 210 may terminate the process for the current identified inquiry data value (e.g., not perform operation 516-520) and move to the next identified inquiry data value.

In an instance in which the similarity score fails to satisfy the similarity score threshold, the process proceeds to operation 516. As shown by operation 516, the apparatus 200 includes means, such as processor 202, memory 204, communications hardware 206, verification circuitry 210, or the like, for determining whether the inquiry data value is valid. In an instance in which the inquiry data value is determined to not be an exact match to the stored data value and the similarity score for the inquiry data value fails to satisfy the similarity score threshold, the verification circuitry 210 may determine whether the inquiry data value is a valid inquiry data value. In particular, the verification circuitry 210 may determine whether the inquiry data value is populated. In an instance in which the inquiry data value is populated, the verification circuitry 210 may determine the inquiry data value is valid. In an instance in which the inquiry data value is not populated, the verification circuitry 210 may determine the inquiry data value is not valid.

In some embodiments, the verification circuitry 210 may determine whether the inquiry data value has one or more errors (e.g., formatting errors such as spacing errors or character errors). For example, an inquiry data value may include 5 spaces in front of a beneficiary name such that the similarity score was determined based on these extraneous space character. As another example, a stored data value may include special characters, such as accent marks, umlauts, or other characters which may not be included in an inquiry data value. In an instance in which the inquiry data value is determined to be error free, the verification circuitry 210 may determine the inquiry data value is valid. In an instance in which the inquiry data value is determined to have one or more errors, the verification circuitry 210 may determine the inquiry data value is not valid.

In an instance in which the inquiry data value is valid, the process proceeds to operation 518. As shown by operation 518, the apparatus 200 includes means, such as processor 202, memory 204, communications hardware 206, verification circuitry 210, or the like, for generating an inquiry data field response indicative of no match for the inquiry data field. In an instance in which the verification circuitry 210 determines the inquiry data value is valid, the verification circuitry 210 may generate the inquiry data field response indicative of no match for the inquiry data field associated with the identified inquiry data value. As such, a requesting entity may be provided with an indication of a significant mismatch between an inquiry data value and a stored data value for the beneficiary despite the inquiry data value being valid. This may indicate that the inquiry data value for the beneficiary of interest is therefore incorrect. The verification circuitry 210 may terminate the process for the current identified inquiry data value and move to the next identified inquiry data value.

In an instance in which the inquiry data value is not valid, the process proceeds to operation 520. As shown by operation 520, the apparatus 200 includes means, such as processor 202, memory 204, communications hardware 206, verification circuitry 210, or the like, for generating an inquiry data field response indicative that the information is unavailable for the inquiry data field. In an instance in which the verification circuitry 210 determines the inquiry data value is not valid, the verification circuitry 210 may generate the inquiry data field response indicative that the information is unavailable for the inquiry data field associated with the identified inquiry data value. As such, a requesting entity may be provided with an indication that a proper determination regarding the validity of the inquiry data value for the inquiry data field could not be determined. The verification circuitry 210 may terminate the process for the current identified inquiry data value and move to the next identified inquiry data value.

Once the operations 504 through 520 are performed for each identified inquiry data value such that an inquiry data field response is generated for each identified inquiry data value, the process may proceed to operation 522. As shown by operation 522, the apparatus 200 includes means, such as processor 202, memory 204, communications hardware 206, verification circuitry 210, or the like, for generating the verification response based on each inquiry data field response. The verification response may include each of the one or more inquiry data field responses for each inquiry data field of interest. As such, a requesting entity may be provided with an indication of a determined validity for each inquiry data value associated with the one or more inquiry data fields of interest for the beneficiary.

Returning now to FIG. 3, as shown by operation 312, the apparatus 200 includes means, such as processor 202, memory 204, communications hardware 206, processing circuitry 208, or the like, for determining whether a scoring process is to be performed. As described in operation 306, the processing circuitry 208 may determine which processes are to be performed on the inquiry data. In an instance in which the inquiry request and/or default process configuration is indicative of an affirmative selection for a scoring process, the processing circuitry 208 may determine to perform a scoring process. A scoring process may be associated with a set of operations that may be performed to generate a scoring response. In some embodiments, the set of operations associated with the scoring process includes calculating one or more insight scores for one or more scored payment types of interest based on stored data values associated with the identified beneficiary account.

In some embodiments, the scoring process may only be performed in an instance in which the identified beneficiary account corresponds to an internal account found in the internal account repository. This is because the scoring process requires an analysis of transactions associated with the beneficiary account and in some embodiments, only the internal account repository 110 may include transaction information due to privacy constraints associated with the shared account repository 112. As such, in an instance in which a scoring process is determined to be performed on the inquiry data but the identified beneficiary account is not an internal account, the scoring circuitry 212 may generate an indication that the scoring process could not be performed for the beneficiary. This indication may be included in a scoring response.

In an instance in which a scoring process is determined to be performed, as determined in operation 306, the process proceeds to operation 314. As shown by operation 314, the apparatus 200 includes means, such as processor 202, memory 204, communications hardware 206, scoring circuitry 212, or the like, for generating a scoring response. As described above, scoring circuitry 212 may perform a scoring process to generate the scoring response. A scoring response may include one or more payment type scoring responses determined for one or more scored payment types of interest. In some embodiments, a payment type scoring response may be indicative of a low return rate or a high return rate for a particular scored payment type or may be indicative that the information is unavailable for a scored payment type.

A scored payment type may be any payment type for which a scoring process may be performed. For example, a scored payment type may include an ACH payment type, a wire transfer payment type, an electronic check payment type, a peer-to-peer transfer payment type, an automated teller machine payment type, a point-of-sale payment type, a cryptocurrency payment type, and/or the like. In some embodiments, the scoring circuitry 212 may determine the one or more scored payment types of interest for the requesting entity by accessing a scored payment type of interest configuration set associated with the requesting entity, such as by using a requesting entity identifier (e.g., requesting entity account number, a requesting entity identifier, a requesting entity username, a requesting entity email address, and/or the like) that may be provided in the inquiry request. The scored payment type of interest configuration set may include one or more payment types that are selected either by default and/or by the particular requesting entity and therefore may be indicative of the one or more scored payment types of interest. The scoring circuitry 212 may then identify the one or more scored payment types of interest based on the scored payment type of interest configuration set. In some embodiments, in an instance in which an inquiry request includes a transaction request, the scoring circuitry 212 may automatically identify a payment type associated with the transaction request as a scored payment type of interest.

As such, the scoring response may provide an indication of beneficiary patterns, such as a return rate, associated with particular scored payment types of interest. For example, an inquiry request may include a transaction request that is associated with an ACH payment type. The scoring circuitry 212 may determine an ACH payment type as a scored payment type of interest (e.g., based on the transaction request and/or scored payment type of interest configuration set) and therefore generate a payment type scoring response for the ACH payment type. The payment type scoring response for the ACH payment type may indicate a high return rate for the ACH payment. The scoring response may include the payment type scoring response for the ACH payment type. As such, a requesting entity may be made aware of a potentially concerning behavior pattern of the beneficiary when ACH payment types are involved such that the requesting entity may determine not to transact with the beneficiary or may take preventative measures for the beneficiary to reduce the likelihood of a return, and thereby avoid associated costs and wasted resources.

Figure 6:
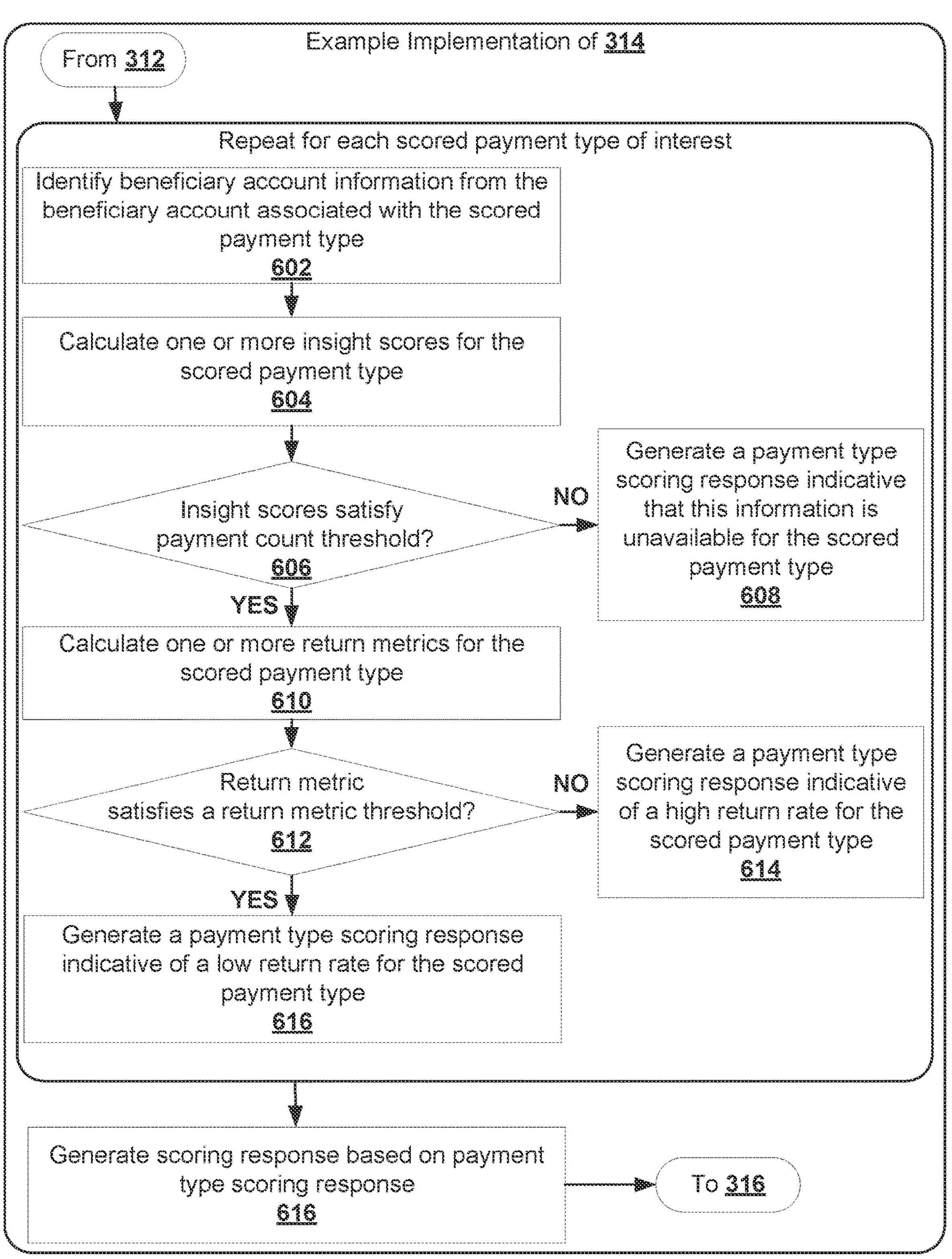
FIG. 6 illustrates an example flowchart for generating a scoring response, in accordance with some example embodiments described herein.

In some embodiments, operation 314 may be performed in accordance with the operations described by FIG. 6. Turning now to FIG. 6, example operations are shown for generating a scoring response.

In some embodiments, the operations 602-616 may be repeated for each scored payment type of interest. As shown by operation 602, the apparatus 200 includes means, such as processor 202, memory 204, communications hardware 206, scoring circuitry 212, or the like, for identifying beneficiary account data from the beneficiary account that is associated with the scored payment type. As described above, beneficiary account data may be obtained from the internal account repository 110 in an instance in which the beneficiary account corresponds to an internal account and internal account number. A beneficiary account may include beneficiary account information that includes private account data, including historical transaction data in which a beneficiary is a party (e.g., payer or payee). In particular, the beneficiary account information may further include historical transactions and historical transaction details (e.g., payer/payee information, payment type information, payment amount information, an indication of whether the transaction was successful, etc.) associated with the beneficiary account.

The beneficiary account information may be formatted, categorized, and/or otherwise organized such that the scoring circuitry 212 may identify the beneficiary account information pertaining to a particular scored payment type of interest. For example, historical transactions may be logged in the beneficiary account and associated with a particular payment type such that the scoring circuitry 212 may query a beneficiary account for beneficiary account information that pertains to a particular scored payment type of interest.

In some embodiments, the scoring circuitry 212 may only identify beneficiary account information that is determined to have occurred within a particular predefined time period. For example, a predefined time period may be thirteen months such that the scoring circuitry 212 only identifies beneficiary account information determined to have occurred within the past thirteen months. The predefined time period set as part of the scoring process may be a predefined value set by an administrator associated with apparatus 200 or may be set by the requesting entity, such as in the inquiry request.

As shown by operation 604, the apparatus 200 includes means, such as processor 202, memory 204, communications hardware 206, scoring circuitry 212, or the like, for calculating one or more insight scores for the scored payment type. Once the scoring circuitry 212 has identified the beneficiary account information associated with the scored payment type of interest, the scoring circuitry 212 may calculate one or more insight scores for the payment type. In some embodiments, an insight score may include a total payment count, a payment volume, a payment frequency, a percentage of payments where the beneficiary is the payer, a percentage of payments where the beneficiary is the payee, and/or the like for the scored payment type of interest. The scoring circuitry 212 may use one or more mathematical and/or logical operations to determine the one or more insight scores for the scored payment type, such as summing the count of total transactions of the particular scored payment type together, categorizing transactions based on whether the transactions were successful, and/or the like.

As shown by operation 606, the apparatus 200 includes means, such as processor 202, memory 204, communications hardware 206, scoring circuitry 212, or the like, determining whether the one or more insight scores satisfy a payment count threshold associated with a corresponding scored payment type. Once the scoring circuitry 212 has determined the one or more insight scores for the scored payment type of interest, the scoring circuitry 212 may determine whether the one or more insight scores satisfy a payment count threshold associated with the scored payment type. In some embodiments, a payment count threshold may describe a minimum number, percentage, etc. of transactions required for a given scored payment type in order to enable sufficient further analysis. For example, a payment count threshold may be defined as ten such that the one or more insight scores are required to indicate ten or more transactions that have occurred within the predefined time period in order to satisfy the payment count threshold. As such, the payment count threshold may enforce standards for processing the data to prevent inaccurate analyses from occurring.

Additionally, the payment count threshold may be individualized for different scored payment types of interest. In some embodiments, the value associated with the payment count threshold may be determined based on an average occurrence of a transaction of the scored payment type based on an analysis of publicly available data. For example, an average user may be determined to perform a higher number of ACH payment type transactions as compared to wire transfer payment type transactions. As such, the payment count threshold may be higher for an ACH scored payment type as compared to a wire transfer scored payment type.

In an instance in which the one or more insight scores fail to satisfy a payment count threshold associated with the corresponding scored payment type, the process proceeds to operation 608. As shown by operation 608, the apparatus 200 includes means, such as processor 202, memory 204, communications hardware 206, scoring circuitry 212, or the like, generating a payment type scoring response indicative that this information is unavailable for the scored payment type. In an instance in which the scoring circuitry 212 determines the one or more insight scores, the scoring circuitry 212 may generate a payment type scoring response indicative that the information is unavailable for the scored payment type. As such, a requesting entity may be provided with an indication that a proper determination regarding the particular scored payment type could not be determined. The scoring circuitry 212 may terminate the process (e.g., not perform operations 610-616) for the current scored payment type of interest and move to the next scored payment type of interest.

In some embodiments, the insight scores generated during operation 604 are associated with low complexity analyses and computational requirements. As such, in an instance in which these lower complexity analyses yield insight scores which fail to satisfy the payment count threshold, the scoring circuitry 212 may conserve additional computational resources by avoiding further processing of the beneficiary account information, thus conserving computational resources.

In an instance in which the one or more insight scores satisfy a payment count threshold associated with the corresponding scored payment type, the process proceeds to operation 610. As shown by operation 610, the apparatus 200 includes means, such as processor 202, memory 204, communications hardware 206, scoring circuitry 212, or the like, calculating one or more return metrics for the scored payment type. Once the scoring circuitry 212 has determined the one or more insight scores satisfy the payment count threshold, the scoring circuitry 212 may calculate return metrics for the scored payment type. A return metric may include an overall number or percentage of transactions which resulted in a return, an overall number or percentage of initiated transactions which were cancelled, an overall number or percentage of transactions which were unsuccessful, and/or the like for the transactions for the scored payment type. The scoring circuitry 212 may use one or more mathematical and/or logical operations to determine the one or more return metrics for the scored payment type.

As shown by operation 612, the apparatus 200 includes means, such as processor 202, memory 204, communications hardware 206, scoring circuitry 212, or the like, determining whether the return metric satisfies a return metric threshold associated with a corresponding scored payment type. Once the scoring circuitry 212 has determined the one or more return metrics for the scored payment type of interest, the scoring circuitry 212 may determine whether the one or more return metrics satisfy a return metric threshold associated with the scored payment type. In some embodiments, a return metric threshold may describe a maximum number, percentage, etc., of transactions that were returned, cancelled, or otherwise unsuccessful for a given scored payment type. For example, a return metric threshold may be defined as 0.5 such that the one or more return metrics are required to indicate that less than 0.5 transactions of the scored payment that have occurred within the predefined time period were returned, cancelled, or unsuccessful in order to satisfy the return metric threshold.

In an instance in which the return metric fails to satisfy the return metric threshold associated with a corresponding scored payment type, the process proceeds to operation 614. As shown by operation 614, the apparatus 200 includes means, such as processor 202, memory 204, communications hardware 206, scoring circuitry 212, or the like, generating a payment type scoring response indicative of a high return rate for the scored payment type. In an instance in which the scoring circuitry 212 determines the return metric fails to satisfy the return metric threshold associated with a corresponding scored payment type, the scoring circuitry 212 may generate a payment type scoring response indicative of a high return rate for the scored payment type. As such, a requesting entity may be provided with an indication that the beneficiary has a history of returned, cancelled, or otherwise unsuccessful transactions for this particular score payment type. As such, the requesting entity may wish to avoid transacting with the beneficiary using this particular payment type. The scoring circuitry 212 may terminate the process for the current scored payment type of interest and move to the next scored payment type of interest.

In an instance in which the return metric satisfies the return metric threshold associated with a corresponding scored payment type, the process proceeds to operation 616. As shown by operation 614, the apparatus 200 includes means, such as processor 202, memory 204, communications hardware 206, scoring circuitry 212, or the like, generating a payment type scoring response indicative of a low return rate for the scored payment type. In an instance in which the scoring circuitry 212 determines the return metric satisfies the return metric threshold associated with a corresponding scored payment type, the scoring circuitry 212 may generate a payment type scoring response indicative of a low return rate for the scored payment type. As such, a requesting entity may be provided with an indication that the beneficiary is has a history of transactions of this particular scored payment type without a history of returned, cancelled, or otherwise unsuccessful transactions. As such, the requesting entity may determine this scored payment type is appropriate to use for a transaction with the beneficiary. The scoring circuitry 212 may terminate the process for the current scored payment type of interest and move to the next scored payment type of interest.

Once the operations 602 through 616 are performed for each scored payment type of interest such that a payment type scoring response is generated for each scored payment type, the process may proceed to operation 618. As shown by operation 618, the apparatus 200 includes means, such as processor 202, memory 204, communications hardware 206, scoring circuitry 212, or the like, for generating the scoring response based on each payment type scoring response. The scoring response may include each of the one or more payment type scoring responses for each scored payment type of interest. As such, a requesting entity may be provided with an indication of an analysis of the beneficiary's transaction history for each scored payment type of interest.

Returning now to FIG. 3, as shown by operation 316, the apparatus 200 includes means, such as processor 202, memory 204, communications hardware 206, processing circuitry 208, or the like, for determining whether an analytics process is to be performed. As described in operation 306, the processing circuitry 208 may determine which processes are to be performed on the inquiry data. In an instance in which the inquiry request and/or default process configuration is indicative of an affirmative selection for an analytics process, the processing circuitry 208 may determine to perform an analytics process. As described in operation 306, the processing circuitry 208 may determine which processes are to be performed on the inquiry data. In an instance in which the inquiry request and/or default process configuration is indicative of an affirmative selection for an analytics process, the processing circuitry 208 may determine to perform an analytics process. An analytics process may be associated with a set of operations that may be performed to generate an analytics response. In some embodiments, the set of operations associated with the analytics process includes determining whether the beneficiary account is indicative of historical data for one or more analytic payment types of interest.

In an instance in which an analytics process is determined to be performed, as determined in operation 306, the process proceeds to operation 318. As shown by operation 318, the apparatus 200 includes means, such as processor 202, memory 204, communications hardware 206, analytics circuitry 214, or the like, for generating an analytics response. As described above, analytics circuitry 214 may perform an analytics process to generate the analytics response. An analytics response may include one or more payment type analytics responses determined for one or more analytic payment types of interest. In some embodiments, a payment type analytics response may be indicative of an existence of a successful historical transaction for an analytic payment type or an absence of a successful historical transaction for the analytic payment type within the beneficiary account that has occurred within a predefined time period.

An analytic payment type may be any payment type for which an analytic process may be performed. For example, an analytic payment type may include an ACH payment type, a wire transfer payment type, an electronic check payment type, a peer-to-peer transfer payment type, an automated teller machine payment type, a point-of-sale payment type, a cryptocurrency payment type, and/or the like. In some embodiments, the analytics circuitry 214 may determine the one or more analytic payment types of interest for the requesting entity by accessing an analytic payment type of interest configuration set associated with the requesting entity, such as by using a requesting entity identifier (e.g., requesting entity account number, a requesting entity identifier, a requesting entity username, a requesting entity email address, and/or the like) that may be provided in the inquiry request. The analytic payment type of interest configuration set may include one or more payment types that are selected either by default and/or by the particular requesting entity and therefore may be indicative of the one or more analytic payment types of interest. The analytics circuitry 214 may then identify the one or more analytic payment types of interest based on the analytic payment type of interest configuration set. In some embodiments, in an instance in which an inquiry request includes a transaction request, the analytics circuitry 214 may automatically identify a payment type associated with the transaction request as an analytic payment type of interest. The one or more payment types identified as analytic payment types of interest may be the same as the one or more scored payment types on interest. Alternatively, one or more payment types identified as analytic payment types of interest may differ from payment types identified as scored payment types on interest In some embodiments, the analytics circuitry 214 may determine a predefined time period for the analytics process. The predefined time period may define a time period during which a particular transaction must occur within. For example, a predefined time period may be ninety-one days such that the analytics circuitry 214 only identifies beneficiary account information determined to have occurred within the past ninety one days. The predefined time period set as part of the analytics process may be a predefined value set by an administrator associated with apparatus 200 or may be set by the requesting entity, such as in the inquiry request. The predefined time period set for the analytics process may differ from a predefined time period set for the scoring process. In some embodiments, the predefined time period set for the analytics response may be shorter as compared to the scoring process. The predefined time period set for the analytics process may be relatively shorter as compared to the predefined time period set for the scoring process, to ensure only recent transaction data for a beneficiary is evaluated. This shortened time window may help ensure the beneficiary is currently familiar with a particular payment type.

The analytics response may provide an indication of whether the beneficiary has a participated in transactions of certain payment types within a particular time period of interest. For example, an inquiry request may include a transaction request that is associated with an ACH payment type. The analytics circuitry 214 may determine an ACH payment type as an analytic payment type of interest (e.g., based on the transaction request and/or analytic payment type of interest configuration set) and therefore generate a payment type analytics response for the ACH payment type. The payment type analytics response for the ACH payment type may indicate that the beneficiary has successfully participated in an ACH transaction within the past ninety-one days. The analytics response may include the payment type analytics response for the ACH payment type. As such, a requesting entity may be made aware that the beneficiary has recently participated in a transaction of the ACH payment type and is thus likely familiar with using an ACH payment type such that the requesting entity may determine an ACH payment type is an appropriate payment type for the transaction.

Figure 7:
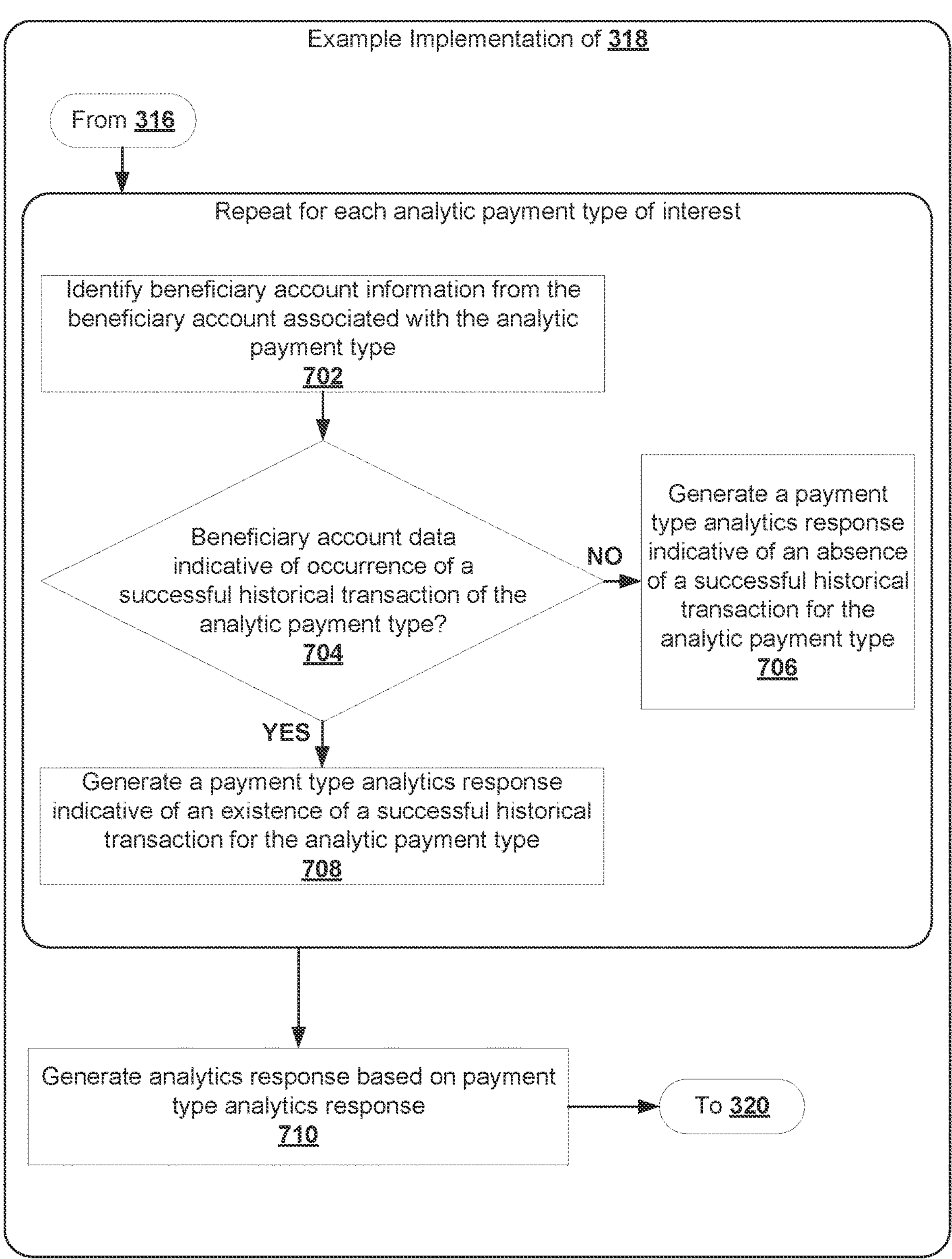
FIG. 7 illustrates an example flowchart for generating an analytics response, in accordance with some example embodiments described herein.

In some embodiments, operation 318 may be performed in accordance with the operations described by FIG. 7. Turning now to FIG. 7, example operations are shown for generating an analytics response.

In some embodiments, the operations 702-708 may be repeated for each analytic payment type of interest. As shown by operation 702, the apparatus 200 includes means, such as processor 202, memory 204, communications hardware 206, analytics circuitry 214, or the like, for identifying beneficiary account data from the beneficiary account that is associated with the analytic payment type. As described above, beneficiary account data may be obtained from the internal account repository 110 in an instance in which the beneficiary account corresponds to an internal account and internal account number. A beneficiary account may include beneficiary account information that includes private account data, including historical transaction data in which a beneficiary is a party (e.g., payer or payee). In particular, the beneficiary account information may further include historical transactions and historical transaction details (e.g., payer/payee information, payment type information, payment amount information, an indication of whether the transaction was successful, etc.) associated with the beneficiary account.

The beneficiary account information may be formatted, categorized, and/or otherwise organized such that the analytics circuitry 214 may identify the beneficiary account information pertaining to a particular analytic payment type of interest. For example, historical transactions may be logged in the beneficiary account and associated with a particular payment type such that the analytics circuitry 214 may query a beneficiary account for beneficiary account information that pertains to a particular analytic payment type of interest.

As described above, in some embodiments, the analytics circuitry 214 may only identify beneficiary account information that is determined to have occurred within a particular predefined time period. For example, a predefined time period may be ninety-one days such that the analytics circuitry 214 only identifies beneficiary account information determined to have occurred within the past ninety-one days. The predefined time period set as part of the scoring process may be a predefined value set by an administrator associated with apparatus 200 or may be set by the requesting entity, such as in the inquiry request.

As shown by operation 704, the apparatus 200 includes means, such as processor 202, memory 204, communications hardware 206, analytics circuitry 214, or the like, for determining whether the beneficiary account data is indicative of a successful historical transaction of the analytic payment type. Once the analytics circuitry 214 has identified the beneficiary account information associated with the analytic payment type of interest, the analytics circuitry 214 may determine whether a historical transaction of the analytic payment type of interest has occurred and further, may determine whether the historical transaction was successful. In some embodiments, the analytics circuitry 214 may be configured to determine whether a historical transaction was successful based on an associated status of the transaction. For example, the analytics circuitry 214 may be configured to determine whether a status of a transaction is indicative of a successful or complete transaction (e.g., a status such as complete, success, etc.) or was unsuccessful or incomplete (e.g., a status such as failed, pending, hold, cancelled, etc.).

In an instance in which the beneficiary account data is not indicative of a successful historical transaction of the analytic payment type, the process proceeds to operation 706. As shown by operation 706, the apparatus 200 includes means, such as processor 202, memory 204, communications hardware 206, analytics circuitry 214, or the like, for generating a payment type analytics response indicative of an absence of a successful historical transaction for the analytic payment type. In an instance in which the analytics circuitry 214 determines beneficiary account data is not indicative of a successful historical transaction of the analytic payment type, the analytics circuitry 214 may generate a payment type analytics response indicative of the absence of a successful historical transaction for the analytic payment type. As such, a requesting entity may be provided with an indication that the beneficiary has not recently participated in a transaction of the analytic payment type successfully. As such, the requesting entity may determine a different payment type may be preferred by the beneficiary. The analytics circuitry 214 may terminate the process for the current analytic payment type of interest and move to the next analytic payment type of interest.

In an instance in which the beneficiary account data is indicative of a successful historical transaction of the analytic payment type that has occurred within the predefined time period, the process proceeds to operation 708. As shown by operation 708, the apparatus 200 includes means, such as processor 202, memory 204, communications hardware 206, analytics circuitry 214, or the like, for generating a payment type analytics response indicative of an existence of a successful historical transaction for the analytic payment type. In an instance in which the analytics circuitry 214 determines beneficiary account data is indicative of a successful historical transaction of the analytic payment type, the analytics circuitry 214 may generate a payment type analytics response indicative of the existence of a successful historical transaction for the analytic payment type. As such, a requesting entity may be provided with an indication that the beneficiary has recently participated in a transaction of the analytic payment type successfully. As such, the requesting entity may this particular payment type may be suitable for the beneficiary. The analytics circuitry 214 may terminate the process for the current analytic payment type of interest and move to the next analytic payment type of interest.

Once the operations 702 through 708 are performed for each analytic payment type of interest such that a payment type analytics response is generated for each analytic payment type, the process may proceed to operation 710. As shown by operation 710, the apparatus 200 includes means, such as processor 202, memory 204, communications hardware 206, analytics circuitry 214, or the like, for generating the analytics response based on each payment type analytics response. The analytics response may include each of the one or more payment type analytics responses for each analytic payment type of interest. As such, a requesting entity may be provided with an indication of an beneficiary comfort level with each analytic payment type of interest.

It will be appreciated that a verification process, scoring process, and/or analytics process may be performed sequentially and in any order. In some embodiments two or more processes may be performed simultaneously, such as via parallel processing. As such, each of a verification response, scoring response, and/or analytics response may be generated in real-time or near real-time.

Returning now to FIG. 3, as shown by operation 320, the apparatus 200 includes means, such as processor 202, memory 204, communications hardware 206, processing circuitry 208, or the like, for generating a beneficiary feedback response. Once each of the processes determined to be performed on the inquiry data have been performed, the processing circuitry 208 may generate the beneficiary feedback response. The beneficiary feedback response may include the verification response, the scoring response, and/or the analytics response, depending on whether a corresponding process was performed. In some embodiments, the beneficiary feedback response may further include a summary of which processes or services were selected for the beneficiary of interest as well as a summary of inquiry request details, such as details regarding the beneficiary of interest and/or details regarding a transaction request.

In some embodiments, the beneficiary feedback response may further include one or more user inputs to allow for the requesting entity to provide user feedback. In some embodiments, in an instance in which the inquiry request is associated with a transaction request, the one or more user inputs may prompt the requesting entity to select whether they would like to proceed with the transaction included in the transaction request. For example, the user inputs may correspond to a "yes" user input and a "no" user input that the requesting entity may interact with (e.g., touch, select, click, etc.) to provide instructions on whether to proceed with the transaction. In some embodiments, a user input may include a user input that causes the apparatus 200 to determine a beneficiation optimization response, indicative of one or more enhanced alternative payment types of the transaction as will be described in further detail in FIGS. 9-10.

As shown by operation 322, the apparatus 200 includes means, such as processor 202, memory 204, communications hardware 206, or the like, for providing the beneficiary feedback response. In some embodiments, the communications hardware 206 provides the beneficiary feedback response to the requesting entity, such as via any one or more of client devices 106A-106N, which may be associated with the requesting entity. In some embodiments, the communications hardware 206 additionally may store the beneficiary feedback response in an associated memory, such as memory 204. The stored beneficiary feedback response may be associated with a requesting entity and/or beneficiary it pertains to.

Figure 8:
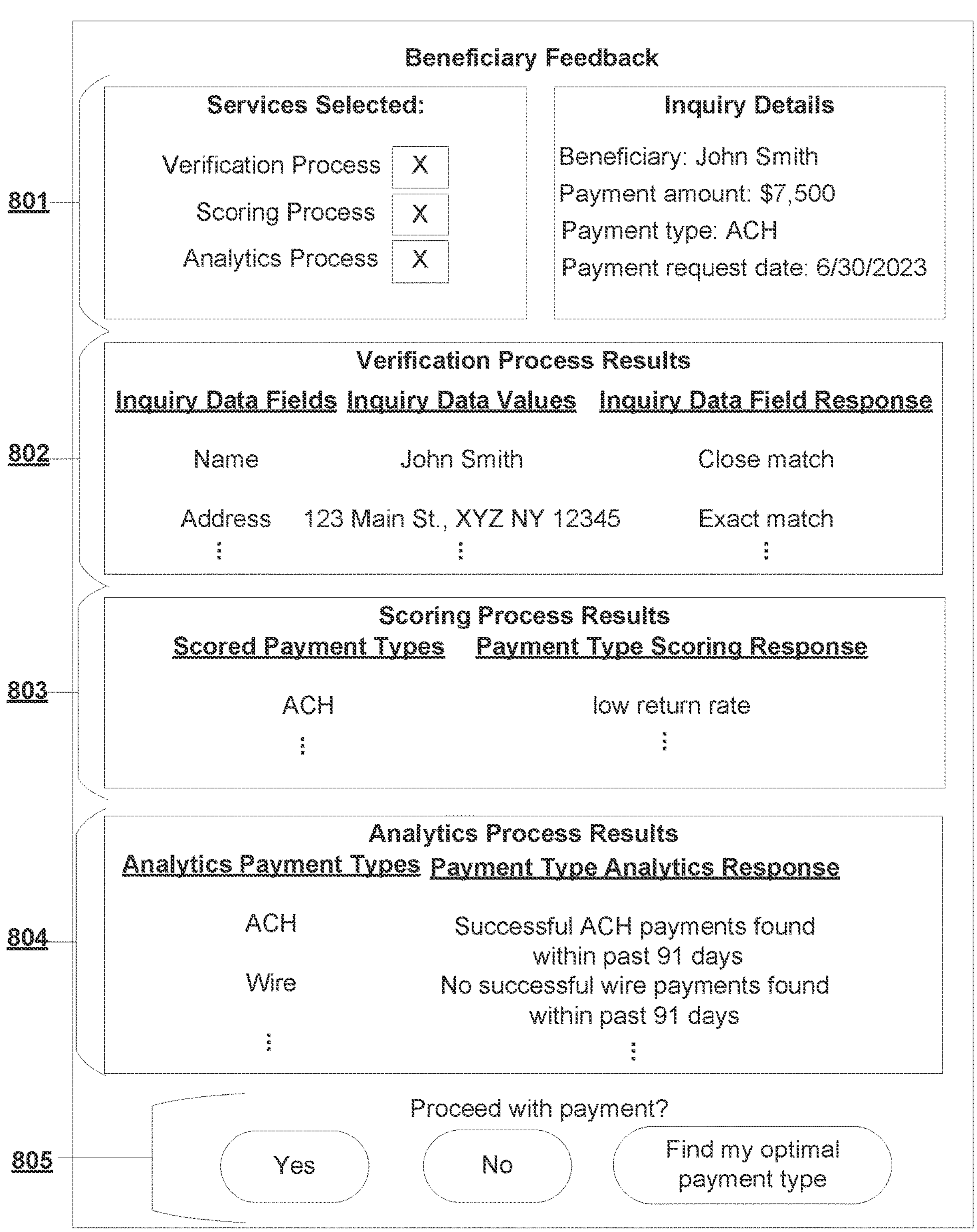
FIG. 8 illustrates an example beneficiary feedback response, as used in some example embodiments described herein.

FIG. 8 is a graphical user interface (GUI) that illustrates an example beneficiary feedback response. As noted previously, a user (e.g., a requesting entity) may interact with the optimizer system 102 by directly engaging with communications hardware 206 of an apparatus 200 comprising a system device of the optimizer system 102. In such an embodiment, the GUI shown in FIG. 8 may be displayed to a user by the apparatus 200. Alternatively, a user may interact with the optimizer system 102 using a separate client device (e.g., any of client devices 106A-106N, as shown in FIG. 1), which may communicate with the optimizer system 102 via communications network 104. In such an embodiment, the GUI shown in FIG. 8 may be displayed to the user by the client device.

As shown by FIG. 8, the beneficiary feedback response may include a summary 801 indicative of which processes or services were selected for the beneficiary of interest as well as the inquiry request details. The beneficiary feedback response incudes a verification response 802 which includes the one or more inquiry data field responses determined for the one or more inquiry data fields of interest. The beneficiary feedback response further incudes a scoring response 803 which includes the one or more payment type scoring responses determined for the one or more scored payment types of interest. The beneficiary feedback response further incudes an analytics response 804 which includes the one or more payment type analytics responses determined for the one or more analytic payment types of interest. Additionally, the beneficiary feedback response further includes the one or more user inputs 805 which may allow a requesting entity to instruct the apparatus whether they would like to proceed with a transaction included in a transaction request which is included in the inquiry request.

Optionally, as shown by operation 324, the apparatus 200 includes means, such as processor 202, memory 204, communications hardware 206, effectuation circuitry 216, or the like, for determining whether (i) the verification response satisfies one or more verification response thresholds, (ii) the scoring response satisfies one or more scoring response thresholds, or (iii) the analytics response satisfies one or more analytic response thresholds. In some embodiments, effectuation circuitry 216 may determine whether a requesting entity has selected to allow the effectuation circuitry 216 to automatically effectuate a transaction included in a transaction request of the inquiry request.

To determine whether the requesting entity has selected this option, the effectuation circuitry 216 may access an effectuation configuration set associated with the requesting entity, such as by using a requesting entity identifier (e.g., requesting entity account number, a requesting entity identifier, a requesting entity username, a requesting entity email address, and/or the like) that may be provided in the inquiry request. The effectuation configuration set may include an indication of whether the requesting entity has opted for automatic transactions to be performed and if so, may further include one or more verification response thresholds, scoring response thresholds, and/or analytics response thresholds for which the verification response, scoring response, and/or analytics response must satisfy, respectively. These thresholds may be selected either by default and/or by the particular requesting entity.

In some embodiments, the one or more verification response thresholds may describe one or more values that the one or more inquiry data field responses determined for the one or more inquiry data fields of interest in the verification response must satisfy. In some embodiments, the one or more scoring response thresholds may describe a value that a scored payment type corresponding to the payment type associated with the transaction must satisfy. In some embodiments, the one or more analytics response thresholds may describe a value that an analytic payment type corresponding to the payment type associated with the transaction must satisfy.

Optionally, as in an instance in which the verification response satisfies one or more verification response thresholds, the scoring response satisfies one or more scoring response thresholds, and/or the analytics response satisfies one or more analytic response thresholds, the process proceeds to operation 326. As shown by operation 326, the apparatus 200 includes means, such as processor 202, memory 204, communications hardware 206, effectuation circuitry 216, or the like, for effectuating a transaction. In an instance in which the verification response satisfies one or more verification response thresholds, the scoring response satisfies one or more scoring response thresholds, and/or the analytics response satisfies one or more analytic response thresholds, the effectuation circuitry 216 may automatically effectuate the transaction on behalf of the requesting entity with the beneficiary. The effectuation circuitry 216 may use the transaction details (e.g., beneficiary name, beneficiary account information, a payment type, etc.) to determine the parameters of the transaction.

In some embodiments, the communications hardware 206 may receive a beneficiary feedback response from the requesting entity, such as via any one of client devices 106A-106N. The beneficiary feedback response may indicate affirmative instructions from the requesting entity to proceed with the transaction included in the transaction request of the inquiry request. As such, the effectuation circuitry 216 may similarly perform the transaction in the event an beneficiary feedback response is received with affirmative instructions to proceed with the transaction.

Generation and Provision of a Beneficiary Optimization Response

Figure 9A:
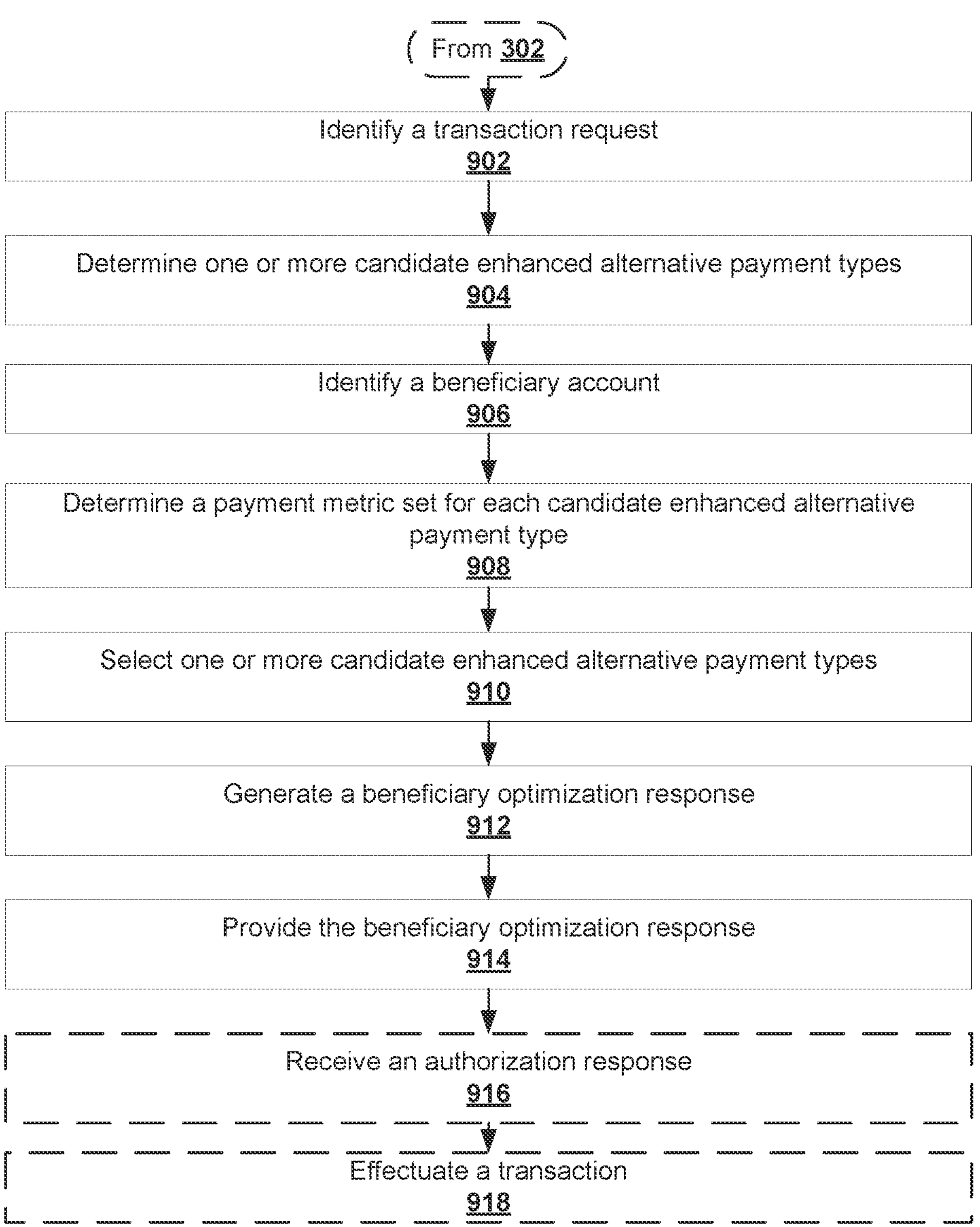
FIGS. 9A and 9B illustrate example flowcharts for generating a beneficiary optimization response, in accordance with some example embodiments described herein.

Turning next to FIG. 9A, example operations are shown for generating a beneficiary optimization response. In some embodiments, an entity may provide apparatus 200 with an indication that they wish to have a transaction request evaluated to determine whether a currently selected payment type for the corresponding transaction is optimal. In an instance in which the payment type for the transaction is not optimal, the entity may wish to receive recommendations regarding alternative payment types which are determined to be suitable for the transaction and may provide enhanced benefits as compared to the current payment type. To address these concerns, the apparatus 200 may generate and provide a beneficiary optimization response for the entity that may be indicative of whether the current payment type for the transaction with a beneficiary is optimal and in an instance in which the current payment type is not optimal, provide one or more enhanced alternative payment types for the transaction. The apparatus 200 may leverage account data stored an internal account repository that includes private account data, including historical transaction data, for users associated with the entity associated with apparatus 200.

Additionally, the apparatus 200 may allow a requesting entity to modify their current payment type selection to an enhanced alternative payment type for a transaction without discarding the current transaction details or starting over. As such, embodiments described herein allow for the conservation of computational resources by allowing a requesting entity to modify an existing transaction request to a different payment type without starting over. Rather, apparatus 200 may determine if the different payment type requires additional information from the requesting entity, and if so, requests only that information such that the transaction may be updated to include said information and can still be effectuated.

As shown by operation 902, the apparatus 200 includes means, such as processor 202, memory 204, communications hardware 206, identification circuitry 218, or the like, for identifying a transaction request. A transaction request may include a requested transaction, a transaction amount, and a recipient of the transaction, and a transaction initiator. The transaction request may further include a payment type for the transaction of the transaction request. For example, a payment type may include an automated clearing house payment type, a wire transfer payment type, an electronic check payment type, a peer-to-peer transfer payment type, an automated teller machine payment type, a point-of-sale payment type, or a cryptocurrency payment type.

In some embodiments, the identification circuitry 218 may identify a transaction request from an inquiry request, such as the inquiry request received in operation 302 of FIG. 3. In an instance in which the inquiry request includes a transaction request, the identification circuitry 218 may identify the transaction request from the inquiry request. Alternatively, the communications hardware 206 may receive a transaction request from a requesting entity separately from an inquiry request. The transaction request may be received from any suitable client device, such as any one or more of client devices 106A-106N.

As shown by operation 904, the apparatus 200 includes means, such as processor 202, memory 204, communications hardware 206, identification circuitry 218, or the like, for determining one or more candidate enhanced alternative payment types. A candidate enhanced alternative payment type may be a payment type different from the current payment type associated with the transaction request. In some embodiments, the candidate enhanced alternative payment type may correspond to a payment type that the identification circuitry 218 has determined to provide a greater benefit to the requesting entity as compared to the current payment type associated with the transaction request. For example, a candidate enhanced alternative payment type may be determined to be suitable for facilitating the transaction described by the transaction request and additionally may be associated with advantages over the current payment type, such as decreased costs, lower processing requirements, decreased transaction time periods, increased security, and/or the like. By way of particular example, a current payment type may be a paper check, which may be associated with relatively high processing costs. As such, the identification circuitry 218 may identify an ACH payment type as a candidate enhanced alternative payment for the transaction due to the ACH payment type being capable of facilitating the transaction as well as being associated with relatively lower processing costs as compared to the paper check payment type. In some embodiments, a candidate enhanced alternative payment type may include an automated clearing house payment type, a wire transfer payment type, an electronic check payment type, a peer-to-peer transfer payment type, an automated teller machine payment type, a point-of-sale payment type, and/or a cryptocurrency payment type.

In some embodiments, the identification circuitry 218 may determine the one or more candidate enhanced alternative payment types based on an analysis of the transaction request. The transaction request may provide transaction details such as a transaction amount. As such, candidate enhanced alternative payment types with improved security may be of interest for transactions associated with larger transactions amounts. In some embodiments, the transaction request may further provide an indication of requested transaction effectuation date, indicative of a desired date for the transaction to be completed by. As such, candidate enhanced alternative payment types with faster transaction time periods may be of interest for transactions associated with narrow requested transaction effectuation dates.

In some embodiments, the identification circuitry 218 may use an identification model, which may be a machine learning model and/or rules-based model that is configured to determine a payment type score for various candidate alternative payment types as well as the current payment type associated with the transaction request. The identification model will be discussed in greater detail in FIG. 10.

Figure 10:
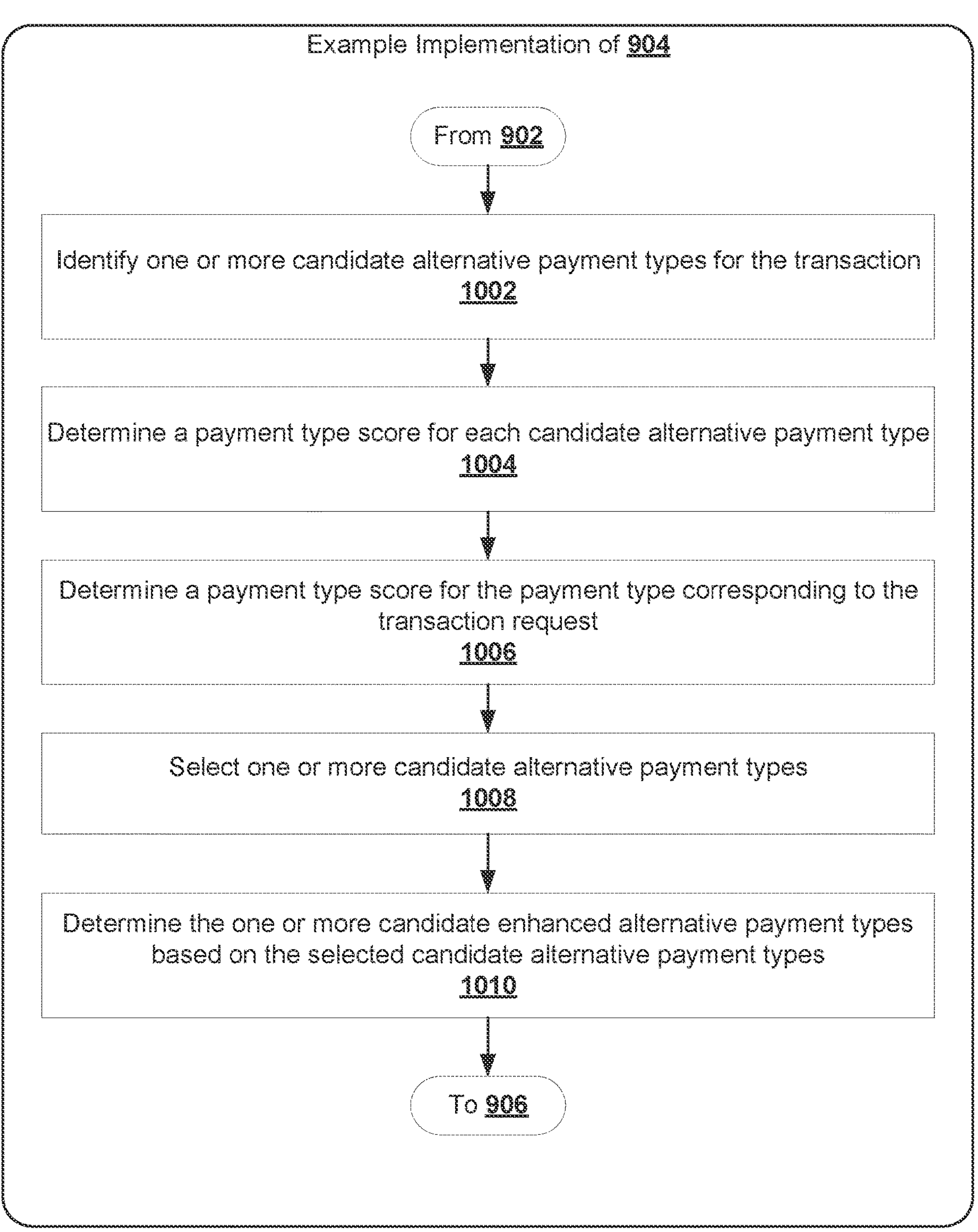
FIG. 10 illustrates an example flowchart for determining one or more candidate enhanced alternative payment types, in accordance with some example embodiments described herein.

In some embodiments, operation 904 may be performed in accordance with the operations described by FIG. 10. Turning now to FIG. 10, example operations are shown for determining the one or more candidate enhanced alternative payment types for the transaction.

As shown by operation 1002, the apparatus 200 includes means, such as processor 202, memory 204, communications hardware 206, identification circuitry 218, or the like, for identifying one or more candidate alternative payment types for the transaction. In some embodiments, the identification circuitry 218 may identify one or more candidate alternative payment types for the transaction. A candidate alternative payment type may be a payment type that the identification circuitry 218 has determined is capable of facilitating the transaction of the transaction request.

In some embodiments, the identification circuitry 218 may access a payment type configuration table to identify the one or more candidate alternative payment types for the transaction. The payment type configuration table may be stored in an associated memory, such as memory 204 or another storage repository. The payment type configuration table may be indicative of one or more available payment types as well as the rules, restrictions, conditions, etc. that apply to each payment type. Additionally, the payment type configuration table may indicate a value of range of values of metrics for the payment type such as associated costs, processing requirements, transaction time periods, and/or security metrics. In some embodiments, the payment type configuration table may be indicative of one or more candidate alternative payment types for a given payment type. For example, the payment type configuration table may indicate an ACH candidate alternative payment type for a paper check payment type. As such, the identification circuitry 218 may access the payment type configuration table to identify the one or more candidate alternative payment types.

In some embodiments, the identification circuitry 218 may use the identification model to identify the one or more candidate alternative payment types. In some embodiments, the identification model may be configured with the payment type configuration table such that it may output the one or more candidate alternative payment types to the identification circuitry 218 and/or perform subsequent operations on the one or more candidate alternative payment types. The identification circuitry 218 may provide the transaction request to the identification model and the identification model may be configured to process the transaction request to identify the one or more candidate alternative payment types, such as by identifying a current payment type of the transaction.

As shown by operation 1004, the apparatus 200 includes means, such as processor 202, memory 204, communications hardware 206, identification circuitry 218, or the like, for determining a payment type score for each candidate alternative payment type. Once the identification circuitry 218 has identified the one or more candidate alternative payment types, the identification circuitry 218 may determine a payment type score for each candidate alternative payment type. A payment type score may be a value that is indicative of an overall benefit to the requesting entity for a corresponding payment type. For example, a payment type score may be a value within the range of −1 to 1, where −1 is an overall complete net negative for the requesting entity and 1 is an overall net positive for the given payment type.

In some embodiments, the identification circuitry 218 may use the identification model to determine the payment type score for each candidate alternative payment type. In particular, the identification model may be configured to infer a payment type score for each candidate alternative payment type based on an analysis of the transaction request. In particular, transaction parameters or details of the transaction request may be analyzed to determine the payment type score for the particular candidate alternative payment type. For example, the transaction parameters or details may indicate a transaction amount, a requested transaction effectuation date, an associated requesting entity, etc. The identification model may also consider the associated metrics for each candidate alternative payment type as described by the payment type configuration table. For example, the identification model may process the cost metrics, processing requirement metrics, transaction time period metrics, and/or security metrics for the candidate alternative payment type for the given payment type to determine the payment type score.

As shown by operation 1006, the apparatus 200 includes means, such as processor 202, memory 204, communications hardware 206, identification circuitry 218, or the like, for determining a payment type score for the payment type corresponding to the transaction request. Similarly, the identification circuitry 218 may determine a payment type score for the current payment type associated with the transaction request. The identification circuitry 218 may determine the payment type score for the current payment type corresponding to the transaction request in a substantially similar manner as the operations described in operation 1004.

As shown by operation 1008, the apparatus 200 includes means, such as processor 202, memory 204, communications hardware 206, identification circuitry 218, or the like, for selecting one or more candidate alternative payment types. Once the identification circuitry 218 has determine a payment type score for each candidate alternative payment type and the current payment type corresponding to the transaction request, the identification circuitry 218 may select one or more candidate alternative payment types. The identification circuitry 218 may select the one or more candidate alternative payment types based on a comparison between an associated payment type score for a corresponding candidate alternative payment type and the payment type score for the payment type corresponding to the transaction.

In particular, the identification circuitry 218 may select the one or more candidate alternative payment types associated with payment type scores that are indicative of a better performance and/or increased benefit for the requesting entity. For example, a current payment type may be a wire transfer associated with a payment type score of 0.1. The one or more candidate alternative payment types may include a paper check payment type associated with a payment type score of −0.1 and an ACH payment type associated with a payment type score of 0.5. As such, the identification circuitry 218 may select the ACH payment type as the candidate alternative payment type but not the paper check payment type.

As shown by operation 1010, the apparatus 200 includes means, such as processor 202, memory 204, communications hardware 206, identification circuitry 218, or the like, for determining the one or more candidate enhanced alternative payment types based on the selected candidate alternative payment types. Once the identification circuitry 218 has selected the one or more candidate alternative payment types, the identification circuitry 218 may determine the one or more selected candidate alternative payment types to be the one or more candidate enhanced alternative payment types as these selected candidate alternative payment types were determined to provide an increased overall benefit for the requesting entity and/or beneficiary as indicated by the corresponding payment type scores.

Returning now to FIG. 9A, as shown by operation 906, the apparatus 200 includes means, such as processor 202, memory 204, communications hardware 206, identification circuitry 218, or the like, for identifying a beneficiary account. In some embodiments, the identification circuitry 218 may identify the beneficiary account for the beneficiary indicated by the transaction request. The identification circuitry may identify the beneficiary account in a substantially similar manner to the identification of the beneficiary account described in operation 304 of FIG. 3.

Furthermore, in some embodiments, the identification circuitry 218 may identify beneficiary account data from the beneficiary account that is associated with a candidate enhanced alternative payment type for each candidate enhanced alternative payment type. The beneficiary account data may be obtained from the internal account repository 110 in an instance in which the beneficiary account corresponds to an internal account and internal account number. A beneficiary account may include beneficiary account information that includes private account data, including historical transaction data in which a beneficiary is a party (e.g., payer or payee). In particular, the beneficiary account information may further include historical transactions and historical transaction details (e.g., payer/payee information, payment type information, payment amount information, an indication of whether the transaction was successful, etc.) associated with the beneficiary account.

The beneficiary account information may be formatted, categorized, and/or otherwise organized such that the identification circuitry 218 may identify the beneficiary account information pertaining to a particular candidate alternative payment type of interest. For example, historical transactions may be logged in the beneficiary account and associated with a particular payment type such that the identification circuitry 218 may query a beneficiary account for beneficiary account information that pertains to a particular candidate alternative payment type.

Additionally, in some embodiments, the identification circuitry 218 may only identify beneficiary account information that is determined to have occurred within a particular predefined time period. For example, a predefined time period may be ninety-one days such that the identification circuitry 218 only identifies beneficiary account information determined to have occurred within the past ninety-one days. The predefined time period may be a predefined value set by an administrator associated with apparatus 200 or may be set by the requesting entity, such as in the inquiry request.

Additionally, the identification circuitry 218 may identify a user preference profile in the beneficiary account. As described above, the user preference profile may be indicative of one or more payment types preferred by the user to facilitate payment and/or payment methods preferred by the user subject to a set of rules and/or conditions.

As shown by operation 908, the apparatus 200 includes means, such as processor 202, memory 204, communications hardware 206, identification circuitry 218, or the like, for determining a payment metric set for each candidate enhanced alternative payment type. A payment metric set may include one or more payment metrics corresponding to a particular candidate enhanced alternative payment type. In particular, the identification circuitry 218 may analyze the beneficiary account information, including historical transaction information, to determine the one or more payment metrics for each candidate enhanced alternative payment type. In some embodiments, payment metrics may include an indication of a number of occurrences of successful historical payments of the candidate enhanced alternative payment type that have occurred within a predefined time period, a number of occurrences of unsuccessful historical payments of the candidate enhanced alternative payment type that have occurred within a predefined time period, an overall count, a total payment count, a payment volume, a payment frequency, a percentage of payments where the beneficiary is the payer, a percentage of payments where the beneficiary is the payee, etc.

In some embodiments, the identification circuitry 218 may be configured to determine whether a historical transaction was successful based on an associated status of the transaction. For example, the identification circuitry 218 may be configured to determine whether a status of a transaction is indicative of a successful or complete transaction (e.g., a status such as complete, success, etc.) or was unsuccessful or incomplete (e.g., a status such as failed, pending, hold, cancelled, etc.).

As shown by operation 910, the apparatus 200 includes means, such as processor 202, memory 204, communications hardware 206, identification circuitry 218, or the like, for selecting one or more candidate enhanced alternative payment types. The identification circuitry 218 may select one or more of the one or more enhanced alternative payment types based on the payment metric set associated with each candidate enhanced alternative payment type. In some embodiments, the identification circuitry 218 may select a candidate enhanced alternative payment type in an instance in which the payment metric set for the candidate enhanced alternative payment type is indicative of at least one successful historical payment of the candidate enhanced alternative payment type that has occurred within the predefined time period.

In some embodiments, the identification circuitry 218 may be configured with one or more payment metric thresholds which payment metrics of a payment metric set must satisfy in order for the identification circuitry to select the corresponding candidate enhanced alternative payment type. For example, a payment metric threshold may describe a maximum of minimum value for a number of occurrences of successful historical payments of the candidate enhanced alternative payment type that have occurred within a predefined time period, a number of occurrences of unsuccessful historical payments of the candidate enhanced alternative payment type that have occurred within a predefined time period, an overall count, a total payment count, a payment volume, a payment frequency, a percentage of payments where the beneficiary is the payer, a percentage of payments where the beneficiary is the payee. In an instance in which the identification circuitry 218 determines payment metrics of a payment metric set satisfy the one or more payment metric thresholds, the identification circuitry 218 may select the candidate enhanced alternative payment type.

In some embodiments, the identification circuitry 218 may use a user preference profile associated with an entity associated with apparatus 200 and/or a user preference profile associated with the beneficiary account when selecting the one or more candidate alternative payment types. In some embodiments, the identification circuitry 218 may be configured to only select candidate enhanced alternative payment types which are indicated as preferred to pay with by the entity associated with apparatus 200 and/or indicated as preferred to receive by the beneficiary. In some embodiments, the identification circuitry 218 may select all candidate enhanced alternative payment types associated payment metrics that satisfy payment metric thresholds but may include an indicator (e.g., a flag, marker, indicia, designator) for candidate enhanced alternative payment types which are indicated as preferred by the beneficiary and/or the entity associated with apparatus 200.

As shown by operation 912, the apparatus 200 includes means, such as processor 202, memory 204, communications hardware 206, identification circuitry 218, or the like, for generating a beneficiary optimization response. Once the identification circuitry 218 has selected the one or more candidate enhanced alternative payment types, the identification circuitry 218 may generate the beneficiary optimization response. The beneficiary optimization response may include the one or more selected candidate enhanced alternative payment types. In some embodiments, the beneficiary optimization response may further include a summary of the transaction. As such, the beneficiary optimization response may be indicative of the one or more candidate enhanced alternative payment types which were determined to be capable of facilitating the transaction as well as providing an increased benefit to the requesting entity.

In some embodiments, the beneficiary optimization response may further include one or more user inputs to allow for the requesting entity to provide user feedback. In some embodiments, the one or more user inputs may prompt the requesting entity to select whether they would like to proceed with the transaction using the initially selected payment type, whether they would like to proceed with the transaction with a candidate enhanced alternative payment type, or whether they would like to forfeit the transaction. For example, the user inputs may correspond to a "yes" user input, "no-change payment type to new payment type", and a "no" user input that the requesting entity may interact with (e.g., touch, select, click, etc.) to provide instructions on whether to proceed with the transaction and/or what payment type to use for the transaction.

As shown by operation 914, the apparatus 200 includes means, such as processor 202, memory 204, communications hardware 206, or the like, for providing the beneficiary optimization response. In some embodiments, the communications hardware 206 provides the beneficiary optimization response to the requesting entity, such as via any one or more of client devices 106A-106N, which may be associated with the requesting entity. In some embodiments, the communications hardware 206 additionally may store the beneficiary optimization response in an associated memory, such as memory 204. The stored beneficiary optimization response may be associated with a requesting entity and/or beneficiary it pertains to.

In some embodiments, the beneficiary optimization response is provided to processing circuitry 208 such that the processing circuitry 208 may include the beneficiary optimization response in the beneficiary feedback response.

As such, the beneficiary feedback response may be updated by the processing circuitry 208 to include the beneficiary optimization response. Alternatively, the beneficiary optimization response is provided to the requesting entity separately from a beneficiary optimization response.

Figure 11:
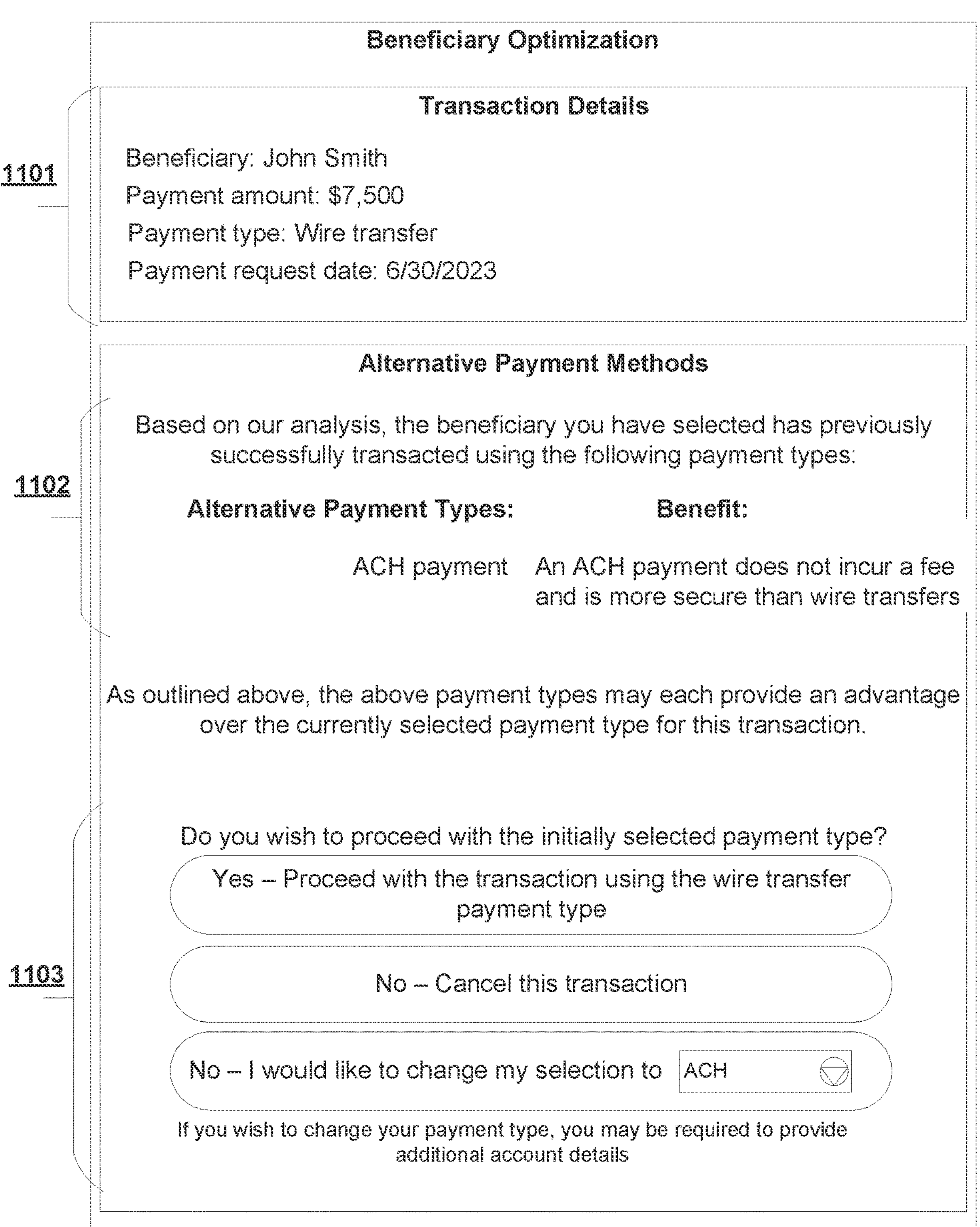
FIG. 11 illustrates an example beneficiary optimization response, as used in some example embodiments described herein.

FIG. 11 is a GUI that illustrates an example beneficiary optimization response. As noted previously, a user (e.g., a requesting entity) may interact with the optimizer system 102 by directly engaging with communications hardware 206 of an apparatus 200 comprising a system device of the optimizer system 102. In such an embodiment, the GUI shown in FIG. 11 may be displayed to a user by the apparatus 200. Alternatively, a user may interact with the optimizer system 102 using a separate client device (e.g., any of client devices 106A-106N, as shown in FIG. 1), which may communicate with the optimizer system 102 via communications network 104. In such an embodiment, the GUI shown in FIG. 11 may be displayed to the user by the client device.

In some embodiments, operations 902-914 may be performed in tandem or synchronously with the operations described in FIG. 3. As such, a beneficiary optimization response may be generated in parallel with a beneficiary feedback response.

As shown by FIG. 11, the beneficiary optimization response may include a summary 1101 indicative of which transaction request details. The beneficiary feedback response incudes one or more candidate enhanced alternative payment types 1102 determined for the transaction request. Additionally, the beneficiary optimization response further includes the one or more user inputs 1103 which may allow a requesting entity to instruct the apparatus whether they would like to proceed with a transaction of an initial payment type included in a transaction request, proceed with the transaction in a candidate enhanced alternative payment type, or forfeit the transaction.

Optionally, as shown by operation 916, the apparatus 200 includes means, such as processor 202, memory 204, communications hardware 206, or the like, for receiving an authorization response. In some embodiments, the communications hardware 206 may be receive the authorization response from a requesting entity via a client device, such as any one of client devices 106A-106N. The authorization response may be indicative of instructions on whether to proceed with the transaction described by the transaction request, modify the transaction to an updated payment type (e.g., one of the candidate enhanced alternative payment types), or discard the transaction. The authorization response may be received in an instance in which the requesting entity interacted with the provided beneficiary optimization response (and/or the beneficiary feedback response which includes the beneficiary optimization response).

In some embodiments, the authorization response further includes an indication of an updated payment type for the transaction. The updated payment type may be indicative of which candidate enhanced alternative payment type to use for the transaction. This updated payment type may be used to facilitate the transaction instead of the original payment type described by the transaction request.

Optionally, as shown by operation 918, the apparatus 200 includes means, such as processor 202, memory 204, communications hardware 206, effectuation circuitry 216 or the like, for effectuating a transaction. In an instance in which the authorization response is affirmative instructions to proceed with the transaction, the effectuation circuitry 216 may effectuate the transaction described by the transaction request. The effectuation circuitry 216 may determine which payment type to use for the transaction based on the authorization response. For example, the authorization response may include an indication of whether to use the original payment type as described by the transaction request or whether to use a different payment type. In some embodiments, the authorization response includes an updated payment type which is indicative of which candidate enhanced alternative payment type to use for the transaction. As such, the effectuation circuitry 216 may automatically update one or more transaction fields for the transaction based on the updated payment type and effectuate the transaction in accordance with the rules of the updated payment type.

In some embodiments, the updated payment type may require additional information in order for the effectuation circuitry 216 to effectuate the transaction using the updated payment type (e.g., a candidate enhanced alternative payment type). The effectuation circuitry 216 may thus generate one or more supplemental information prompts that may be provided to the requesting entity using communications hardware 206. The one or more supplemental information prompts may include prompts for the requesting user to supply the missing information necessary to proceed with the transaction in accordance with the updated transaction type. Once the communications hardware 206 receives one or more responses from the requesting entity which supplies this information, the effectuation circuitry 216 may use this supplemental information to update the transaction information and effectuate the transaction. In some embodiments, the beneficiary optimization response may include instructions to present these supplemental information prompts in an instance a requesting entity selects a particular candidate alternative payment type.

In an instance in which the authorization response includes affirmative instructions to proceed with the transaction and in an instance in which an updated payment type is indicated, once the effectuation circuitry 216 has updated the payment type, the effectuation circuitry 216 may effectuate the transaction. The effectuation circuitry 216 may use the transaction details (e.g., beneficiary name, beneficiary account information, a payment type, etc.) to determine the parameters of the transaction.

Figure 9B:
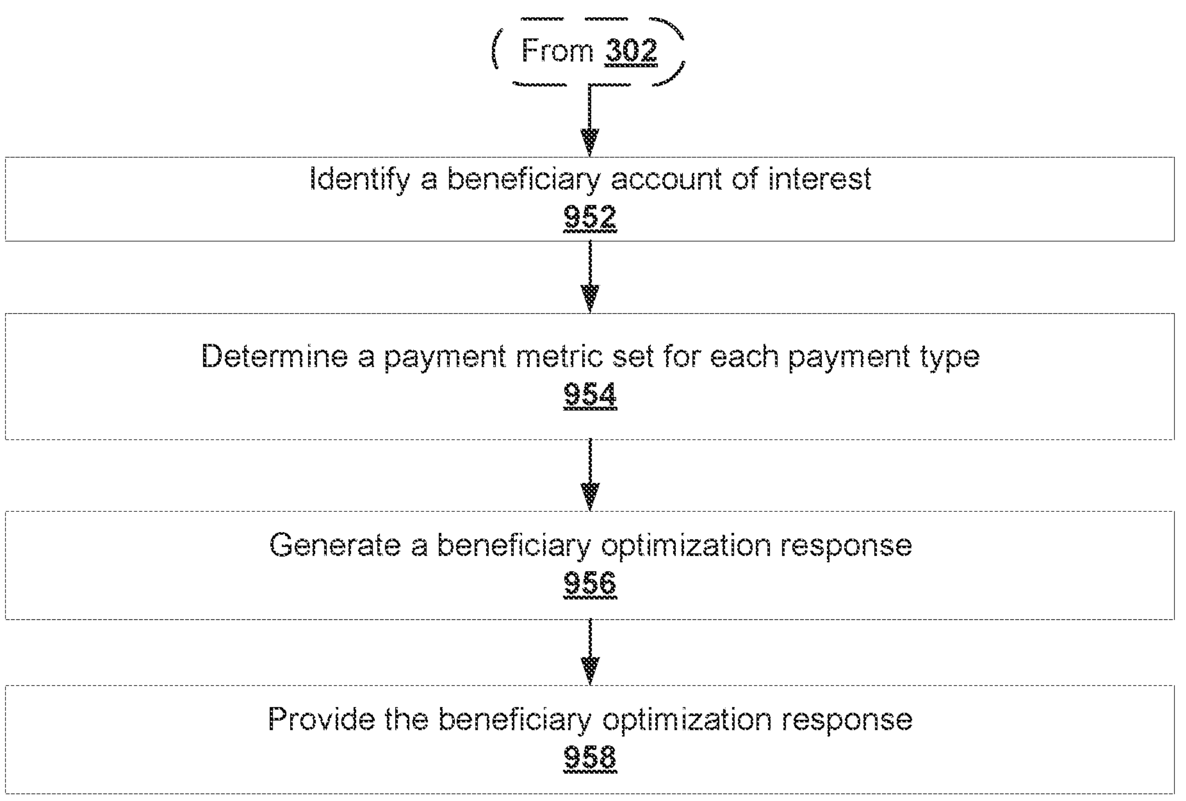

Turning now to FIG. 9B, example operations are shown for generating a beneficiary optimization response without requiring a corresponding transaction for the beneficiary. In such embodiments, the beneficiary optimization response may include an overall summary or picture of a payment methods used by the beneficiary. The apparatus 200 may generate and provide a beneficiary optimization response for the entity that may be indicative of the payment types used by the beneficiary as well as one or more payment metrics for a payment type. The apparatus 200 may leverage account data stored an internal account repository that includes private account data, including historical transaction data, for users associated with the entity associated with apparatus 200.

As shown by operation 952, the apparatus 200 includes means, such as processor 202, memory 204, communications hardware 206, identification circuitry 218, or the like, for identifying a beneficiary account of interest. In some embodiments, the identification circuitry 218 may identify a beneficiary account of interest from a transaction request, an inquiry request, or a separate beneficiary account request.

As described above in operation 902, a transaction request may include a requested transaction and may further include some transaction details (e.g., a transaction amount, a recipient of the transaction, and a transaction provider. However, the transaction request may not include a payment type. In some embodiments, the identification circuitry 218 may identify a beneficiary of interest and/or transaction request from an inquiry request, such as the inquiry request received in operation 302 of FIG. 3. In an instance in which the inquiry request includes a beneficiary information, the identification circuitry 218 may identify the beneficiary account of interest from the inquiry request. Alternatively, the communications hardware 206 may receive a beneficiary account request from a requesting entity separately from an inquiry request and/or transaction request. The beneficiary account request may be received from any suitable client device, such as any one or more of client devices 106A-106N. The beneficiary account request may include an indication of a beneficiary information. For example, the beneficiary account request may data values for data fields such as a first name, a last name, a business name, a middle name, a beneficiary address, a phone number, an email address, a physical address (e.g., address line 1, address line 2, city, state, postal code, country), a date of birth, a social security number, a taxpayer identification number, a death indicator (e.g., indicative of whether the beneficiary is alive or deceased), beneficiary payment preferences, a bank identifier code, an account number, and/or the like. The values for the one or more data fields may provide beneficiary information that can be used to identify a beneficiary account of interest.

In some embodiments, the identification circuitry 218 may identify the beneficiary account for the beneficiary indicated by the transaction request, inquiry request, and/or beneficiary account request. The identification circuitry may identify the beneficiary account in a substantially similar manner to the identification of the beneficiary account described in operation 304 of FIG. 3. A beneficiary account may include beneficiary account information that includes private account data, including historical transaction data in which a beneficiary is a party (e.g., payer or payee). In particular, the beneficiary account information may further include historical transactions and historical transaction details (e.g., payer/payee information, payment type information, payment amount information, an indication of whether the transaction was successful, etc.) associated with the beneficiary account.

The beneficiary account information may be formatted, categorized, and/or otherwise organized such that the identification circuitry 218 may identify the beneficiary account information pertaining to a particular payment types of interest. For example, historical transactions may be logged in the beneficiary account and associated with a particular payment type such that the identification circuitry 218 may query a beneficiary account for beneficiary account information that pertains to a particular payment type.

Additionally, in some embodiments, the identification circuitry 218 may only identify beneficiary account information that is determined to have occurred within a particular predefined time period. For example, a predefined time period may be ninety-one days such that the identification circuitry 218 only identifies beneficiary account information determined to have occurred within the past ninety-one days. The predefined time period may be a predefined value set by an administrator associated with apparatus 200 or may be set by the requesting entity, such as in the inquiry request.

As shown by operation 954, the apparatus 200 includes means, such as processor 202, memory 204, communications hardware 206, identification circuitry 218, or the like, for determining a payment metric set for each payment type. In some embodiments, the identification circuitry 218 may be configured to determine payment metric sets for various payment types. These payment types may be any available payment types (e.g., candidate payment types) or a subset of payment types selected by a user. For example, a beneficiary account request may specify payment types of interest. Thus, the identification circuitry 218 may determine a payment metric set using the beneficiary account information for each identified payment type. The payment types may include an automated clearing house payment type, a wire transfer payment type, an electronic check payment type, a peer-to-peer transfer payment type, an automated teller machine payment type, a point-of-sale payment type, and/or a cryptocurrency payment type. In some embodiments, these payment types need not provide an improvement over a current transaction type (if applicable).

A payment metric set may include one or more payment metrics corresponding to a particular payment type. In particular, the identification circuitry 218 may analyze the beneficiary account information, including historical transaction information, to determine the one or more payment metrics for each payment type. In some embodiments, payment metrics may include an indication of a number of occurrences of successful historical payments of the payment type that have occurred within a predefined time period, a number of occurrences of unsuccessful historical payments of the payment type that have occurred within a predefined time period, an overall count, a total payment count, a payment volume, a payment frequency, a percentage of payments where the beneficiary is the payer, a percentage of payments where the beneficiary is the payee, etc.

In some embodiments, the identification circuitry 218 may be configured to determine whether a historical transaction was successful based on an associated status of the transaction. For example, the identification circuitry 218 may be configured to determine whether a status of a transaction is indicative of a successful or complete transaction (e.g., a status such as complete, success, etc.) or was unsuccessful or incomplete (e.g., a status such as failed, pending, hold, cancelled, etc.).

As shown by operation 956, the apparatus 200 includes means, such as processor 202, memory 204, communications hardware 206, identification circuitry 218, or the like, for generating a beneficiary optimization response. Once the identification circuitry 218 has determined payment metric sets for each payment type, the identification circuitry 218 may generate the beneficiary optimization response. The beneficiary optimization response may include the payment metric set for the payment types. As such, the beneficiary optimization response may be indicative of the one or more payment types that a beneficiary is associated with such that an end user may be able to evaluate and ensure a user is associated with various payment types. The end user can then more confidently select an appropriate payment type for a future transaction.

As shown by operation 958, the apparatus 200 includes means, such as processor 202, memory 204, communications hardware 206, or the like, for providing the beneficiary optimization response. In some embodiments, the communications hardware 206 provides the beneficiary optimization response to the requesting entity, such as via any one or more of client devices 106A-106N, which may be associated with the requesting entity. In some embodiments, the communications hardware 206 additionally may store the beneficiary optimization response in an associated memory, such as memory 204. The stored beneficiary optimization response may be associated with a requesting entity and/or beneficiary it pertains to.

In some embodiments, the beneficiary optimization response is provided to processing circuitry 208 such that the processing circuitry 208 may include the beneficiary optimization response in the beneficiary feedback response. As such, the beneficiary feedback response may be updated by the processing circuitry 208 to include the beneficiary optimization response. Alternatively, the beneficiary optimization response is provided to the requesting entity separately from a beneficiary optimization response.

Example System Frameworks and Architectures for Optimizer System

Figure 12:
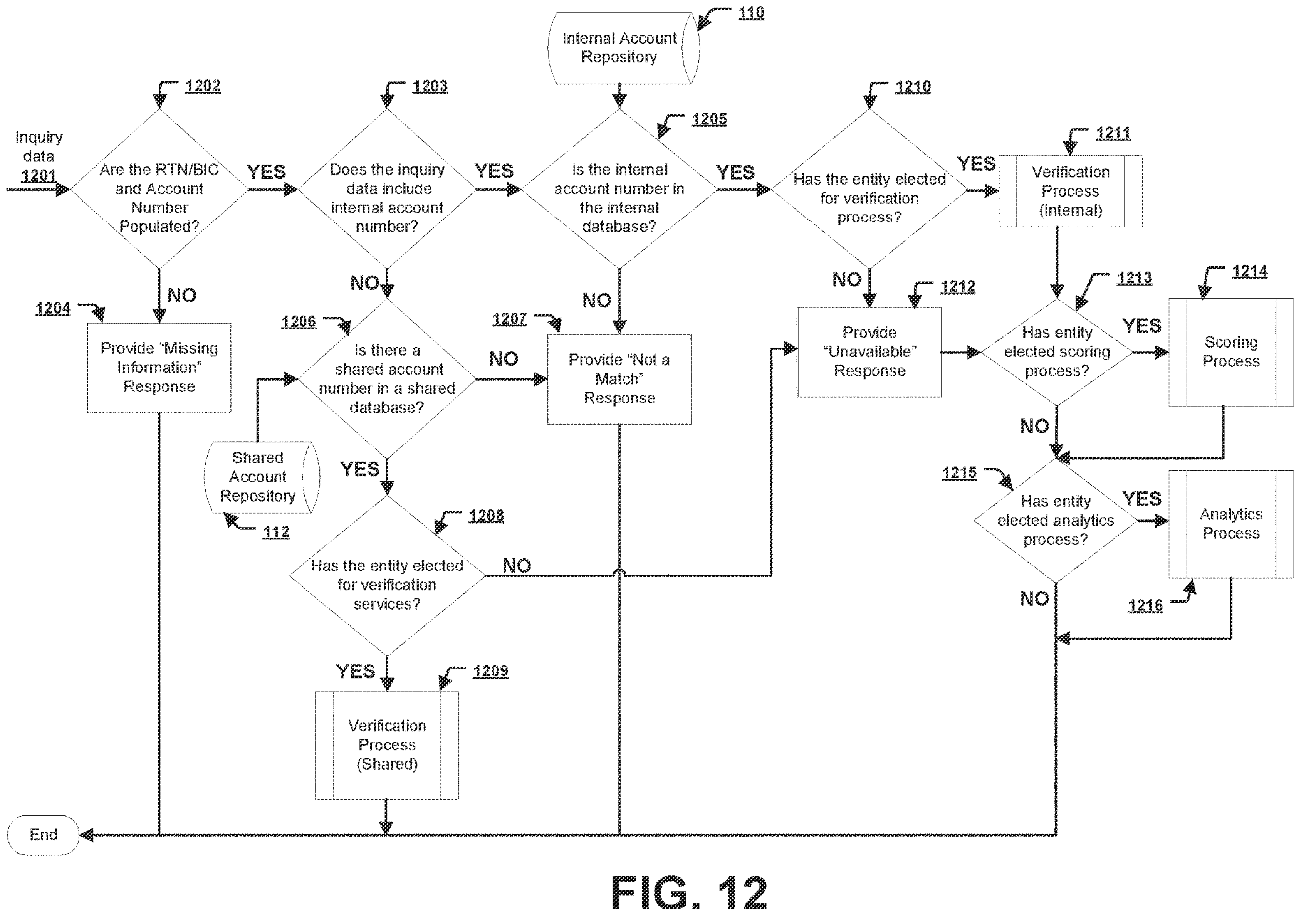
FIG. 12 provides an operational example of a process workflow for generating a beneficiary feedback response and/or beneficiary optimization response, in accordance with some example embodiments described herein.

FIGS. 12-16 illustrate an example frameworks, architectures, and workflows that may be implemented by the optimizer system 102. The various operations of FIG. 12-16 may be performed by apparatus 200 in accordance with the operations described above. Turning first to FIG. 12, an operational example of an optimizer system workflow is illustrated. As shown in FIG. 12, inquiry data 1201 is received an operation 1202 may determine whether a routing (RAN) number and/or BIC/SWIFT code as well as an account number are populated within the inquiry data 1201. In an instance in which these inquiry data values are not populated, the workflow may proceed to operation 1204 where a "missing information" response is provided, such as in the beneficiary feedback response. In an instance in which the inquiry data values are populated, the workflow may proceed to operation 1203 where it may be determined whether the inquiry data includes an internal account number (e.g., is indicative of an internal account number).

In an instance in which the inquiry data does not include an internal account, the workflow may proceed to operation 1206. At operation 1206, it may be determined whether a shared account number is included in a shared account repository 112. In an instance in which the shared account number is included in the shared account repository 112, the workflow may proceed to operation 1208. At operation 1208, it may be determined whether the entity has elected for a verification process. In an instance in which the entity has elected for a verification process, the workflow may proceed to operation 1209. At operation 1209, a shared verification process may be performed on the inquiry data as discussed in further detail with respect to FIG. 14. In an instance in which the entity has not elected for a verification process, the workflow may proceed to operation 1207. At operation 1212, an "unavailable" response may be provided, such as in the beneficiary feedback response.

Returning to operation 1203, in an instance in which the inquiry data includes an internal account, the workflow may proceed to operation 1205. At operation 1205, it may be determined whether the internal account number is included in the internal account repository 110. In an instance in which the internal account number is not included in the internal account repository 110, the workflow may proceed to operation 1207. At operation 1207, a "not a match" response may be provided, such as in the beneficiary feedback response. In an instance in which the internal account number is included in the internal account repository 110, the workflow may proceed to operation 1210. At operation 1210, it may be determined whether the entity has elected for a verification process. In an instance in which the entity did not elect for a verification process, the workflow may proceed to operation 1212. At operation 1212, an "unavailable" response may be provided, such as in the beneficiary feedback response. In an instance in which the entity elected for a verification process, the workflow may proceed to operation 1211. At operation 1211, an internal verification process may be performed on the inquiry data as discussed in further detail with respect to FIG. 13.

Regardless of whether a verification process was performed, the workflow may proceed for either operation 1212 or 1211 to operation 1213. At operation 1213, it may be determined whether the entity has elected for a scoring process. In an instance in which the entity elected for a scoring process, the workflow may proceed to operation 1214. At operation 1214, a scoring process may be performed as discussed in further detail with respect to FIG. 15. In an instance in which the entity did not elect for a scoring process, the workflow may proceed to operation 1215.

At operation 1215, it may be determined whether the entity has elected for an analytics process. In an instance in which the entity elected for an analytics process, the workflow may proceed to operation 1216. At operation 1215, an analytics process may be performed as discussed in further detail with respect to FIG. 16. Once the analytics process is performed or the analytics processed was determined that the entity did not elect for the analytics process, the workflow may end and a beneficiary feedback response may be generated.

Figure 13:
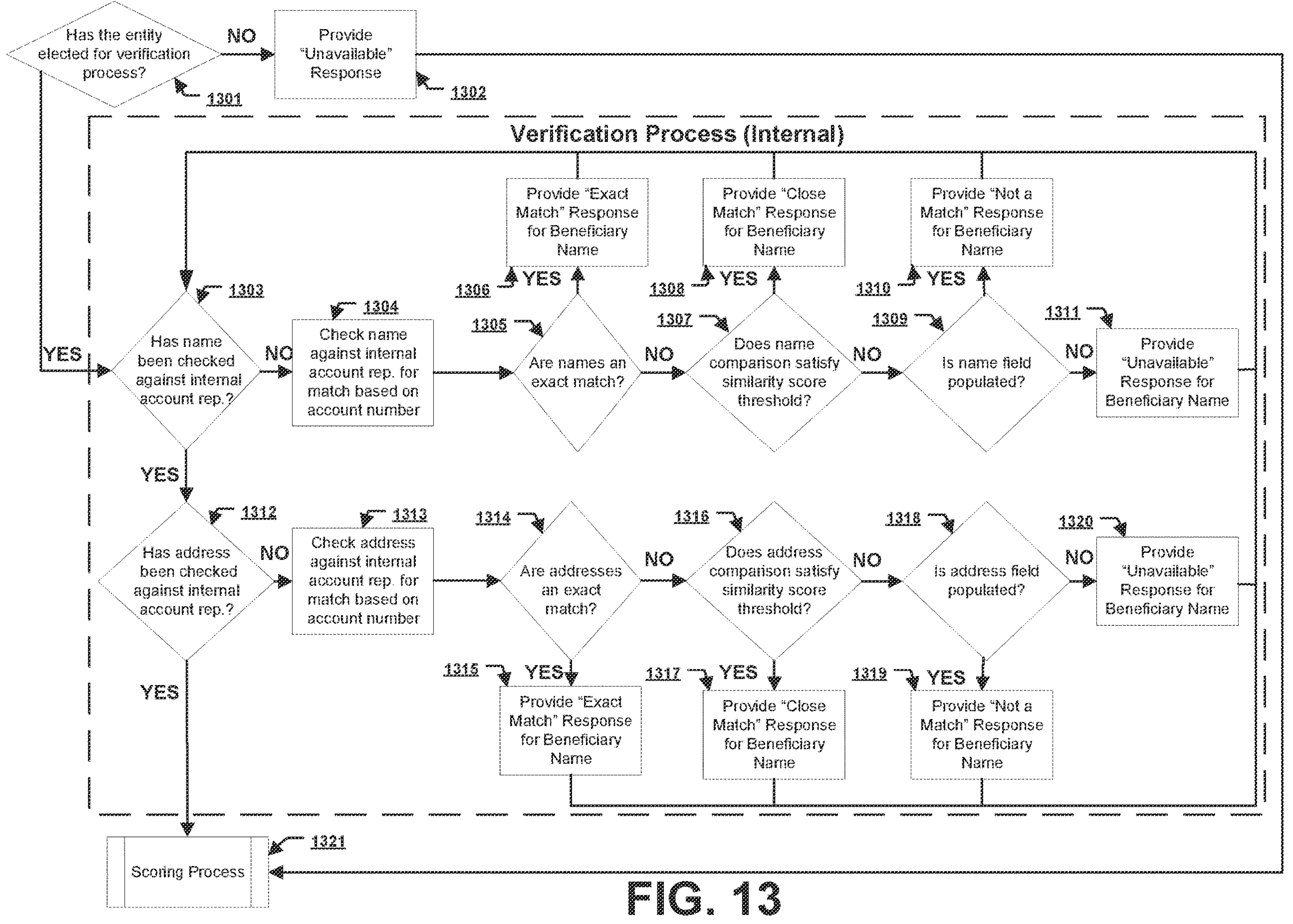
FIG. 13 provides an operational example of an internal verification process workflow for generating a verification response, in accordance with some example embodiments described herein.

Turning now to FIG. 13, an example workflow for a shared verification process is shown. As shown in FIG. 13, first at operation 1301, it may be determined whether the entity (e.g., requesting entity) has elected for a verification process to be performed. In an instance the entity did not elect for a verification process, the workflow may proceed to operation 1302, where an "unavailable" response may be generated for the verification response. In an instance the entity elected for a verification process, the workflow may proceed to operation 1303, where a first inquiry data value for an inquiry data field of interest may be checked against an internal account repository. In particular, the inquiry data field of interest may be a name. At operation 1303, it may be determined whether a name has been checked against the internal account repository. In an instance a name has not been checked against the internal account repository, the workflow may proceed to operation 1304. At operation 1304, a name included in the inquiry data may be checked against a name in the internal account repository for the beneficiary account. The workflow may then proceed to operation 1305, where it may be determined whether the names are an exact match. If the names are an exact match, the workflow proceeds to operation 1306, where a verification response "exact match" is provided for the beneficiary name inquiry data field. If the names are not an exact match, the workflow proceeds to operation 1307, where it is determined whether the name comparison satisfies a similarity score (e.g., does a similarity score associated with the inquiry data value satisfy a similarity score threshold). If the comparison does satisfy a similarity score threshold, the workflow proceeds to operation 1308, where a verification response "close match" is provided for the beneficiary name inquiry data field. If the comparison does not satisfy a similarity score threshold, the workflow proceeds to operation 1309, where it is determined whether the name inquiry data field is populated (e.g., is valid). In an instance in which the name inquiry data field is populated, the workflow proceeds to operation 1310, where a verification response "not a match" is provided for the beneficiary name inquiry data field. In an instance in which the name inquiry data field is not populated, the workflow proceeds to operation 1310, where a verification response "unavailable" is provided for the beneficiary name inquiry data field. The workflow may proceed back to operation 1303, where it may be determined whether the name has been checked against the internal account repository.

In an instance in which the name has been checked against the internal account repository, the workflow proceeds to operation 1312. At operation 1312, a next inquiry data value for an inquiry data field of interest may be checked against an internal account repository. In particular, the inquiry data field of interest may be an address. At operation 1312, it may be determined whether the address has been checked against the internal account repository. In an instance an address has not been checked against the internal account repository, the workflow may proceed to operation 1313. At operation 1313, an address included in the inquiry data may be checked against an address in the internal account repository for the beneficiary account. The workflow may then proceed to operation 1314, where it may be determined whether the addresses are an exact match. If the addresses are an exact match, the workflow proceeds to operation 1315, where a verification response "exact match" is provided for the beneficiary address inquiry data field. If the addresses are not an exact match, the workflow proceeds to operation 1316, where it is determined whether the address comparison satisfies a similarity score (e.g., does a similarity score associated with the inquiry data value satisfy a similarity score threshold). If the comparison does satisfy a similarity score threshold, the workflow proceeds to operation 1317, where a verification response "close match" is provided for the beneficiary address inquiry data field. If the comparison does not satisfy a similarity score threshold, the workflow proceeds to operation 1318, where it is determined whether the address inquiry data field is populated (e.g., is valid). In an instance in which the address inquiry data field is populated, the workflow proceeds to operation 1319, where a verification response "not a match" is provided for the beneficiary address inquiry data field. In an instance in which the address inquiry data field is not populated, the workflow proceeds to operation 1320, where a verification response "unavailable" is provided for the beneficiary address inquiry data field. The workflow may proceed back to operation 1303. Once the inquiry data values for all inquiry data fields of interest are checked, the workflow may proceed to operation 1321, where a scoring process may be performed, as described in further detail in FIG. 15.

Figure 14:
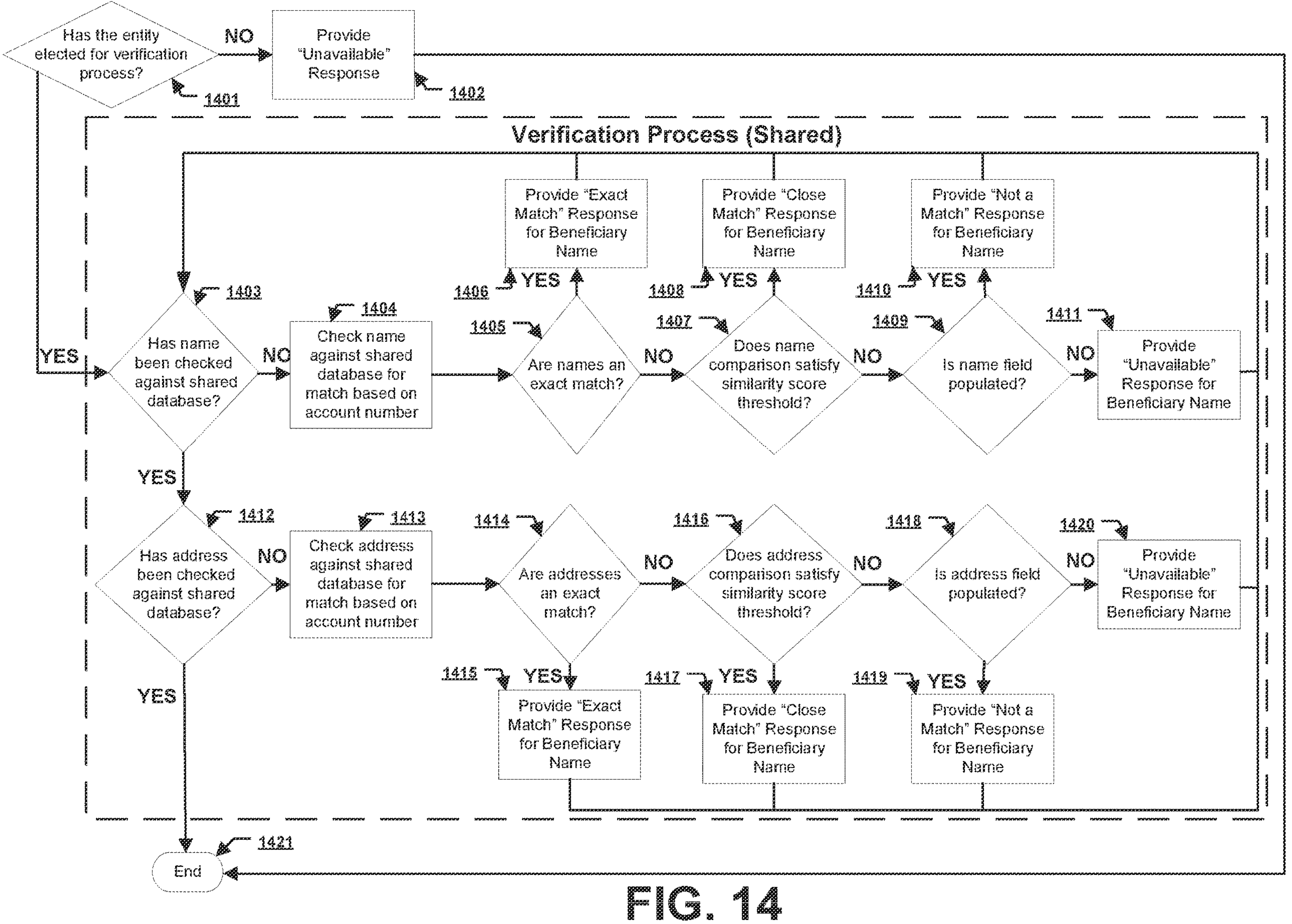
FIG. 14 provides an operational example of a shared verification process workflow for generating a verification response, in accordance with some example embodiments described herein.

Turning next to FIG. 14, an example workflow for a shared verification process is shown. As shown in FIG. 14, first at operation 1401, it may be determined whether the entity (e.g., requesting entity) has elected for a verification process to be performed. In an instance the entity did not elect for a verification process, the workflow may proceed to operation 1402, where an "unavailable" response may be generated for the verification response. In an instance the entity elected for a verification process, the workflow may proceed to operation 1403, where a first inquiry data value for an inquiry data field of interest may be checked against a shared account repository. In particular, the inquiry data field of interest may be a name. At operation 1403, it may be determined whether a name has been checked against the shared account repository. In an instance a name has not been checked against the shared account repository, the workflow may proceed to operation 1404. At operation 1404, a name included in the inquiry data may be checked against a name in the shared account repository for the beneficiary account. The workflow may then proceed to operation 1405, where it may be determined whether the names are an exact match. If the names are an exact match, the workflow proceeds to operation 1406, where a verification response "exact match" is provided for the beneficiary name inquiry data field. If the names are not an exact match, the workflow proceeds to operation 1407, where it is determined whether the name comparison satisfies a similarity score (e.g., does a similarity score associated with the inquiry data value satisfy a similarity score threshold). If the comparison does satisfy a similarity score threshold, the workflow proceeds to operation 1408, where a verification response "close match" is provided for the beneficiary name inquiry data field. If the comparison does not satisfy a similarity score threshold, the workflow proceeds to operation 1409, where it is determined whether the name inquiry data field is populated (e.g., is valid). In an instance in which the name inquiry data field is populated, the workflow proceeds to operation 1410, where a verification response "not a match" is provided for the beneficiary name inquiry data field. In an instance in which the name inquiry data field is not populated, the workflow proceeds to operation 1410, where a verification response "unavailable" is provided for the beneficiary name inquiry data field. The workflow may proceed back to operation 1403, where it may be determined whether the name has been checked against the shared account repository.

In an instance in which the name has been checked against the shared account repository, the workflow proceeds to operation 1412. At operation 1412, a next inquiry data value for an inquiry data field of interest may be checked against a shared account repository. In particular, the inquiry data field of interest may be an address. At operation 1412, it may be determined whether the address has been checked against the shared account repository. In an instance an address has not been checked against the shared account repository, the workflow may proceed to operation 1413. At operation 1413, an address included in the inquiry data may be checked against an address in the shared account repository for the beneficiary account. The workflow may then proceed to operation 1414, where it may be determined whether the addresses are an exact match. If the addresses are an exact match, the workflow proceeds to operation 1415, where a verification response "exact match" is provided for the beneficiary address inquiry data field. If the addresses are not an exact match, the workflow proceeds to operation 1416, where it is determined whether the address comparison satisfies a similarity score (e.g., does a similarity score associated with the inquiry data value satisfy a similarity score threshold). If the comparison does satisfy a similarity score threshold, the workflow proceeds to operation 1417, where a verification response "close match" is provided for the beneficiary address inquiry data field. If the comparison does not satisfy a similarity score threshold, the workflow proceeds to operation 1418, where it is determined whether the address inquiry data field is populated (e.g., is valid). In an instance in which the address inquiry data field is populated, the workflow proceeds to operation 1419, where a verification response "not a match" is provided for the beneficiary address inquiry data field. In an instance in which the address inquiry data field is not populated, the workflow proceeds to operation 1420, where a verification response "unavailable" is provided for the beneficiary address inquiry data field. The workflow may proceed back to operation 1403. Once the inquiry data values for all inquiry data fields of interest are checked, the workflow may proceed to operation 1421, the workflow may end.

Figure 15:
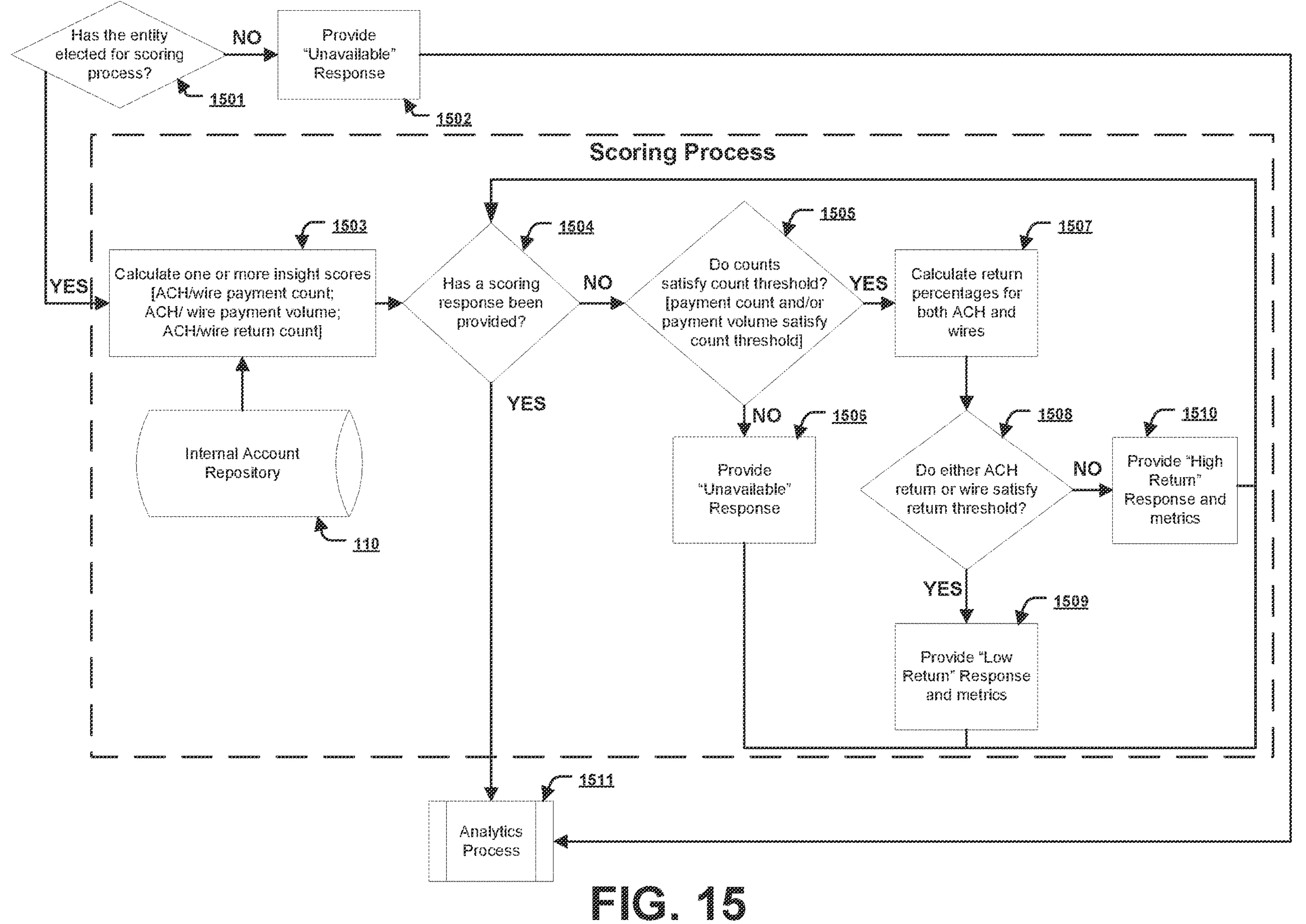
FIG. 15 provides an operational example of a scoring process workflow for generating a scoring response, in accordance with some example embodiments described herein.

Turning next to FIG. 15, an example workflow for a scoring process is shown. As shown in FIG. 15, first at operation 1501, it may be determined whether the entity (e.g., requesting entity) has elected for a scoring process to be performed. In an instance the entity did not elect for a scoring process, the workflow may proceed to operation 1502, where an "unavailable" response may be generated for the scoring response. In an instance the entity elected for a scoring process, the workflow may proceed to operation 1503, where one or more insight scores may be generated for the beneficiary account using the internal account repository 110. The workflow may proceed to operation 1504, where it may be determined whether a scoring response has been provided. In an instance in which a scoring response has not been provided, the workflow may proceed to operation 1505. At operation 1505, it may be determined whether the one or more insight scores satisfy the one or more payment count thresholds. In an instance in which the one or more payment count thresholds are not satisfied, the workflow may proceed to operation 1506, where an "unavailable" response may be generated for the scoring response. In an instance in which the one or more payment count thresholds are satisfied, the workflow may proceed to operation 1507, where one or more return metrics may be calculated for the beneficiary account. The workflow may then proceed to operation 1508, where it may be determined whether the one or more return metrics satisfy a return metric threshold. In an instance in which the one or more return metrics satisfy a return metric threshold, the workflow may proceed to operation 1509, where a "low return" response may be generated for the scoring response. In an instance in which the one or more return metrics fail to satisfy the return metric threshold, the workflow may proceed to operation 1510, where a "high return" response may be generated for the scoring response. The workflow may proceed back to operation 1504. Once the scoring response has been provided, the workflow may proceed to operation 1511, where an analytics process may be performed, as described in further detail in FIG. 16.

Figure 16:
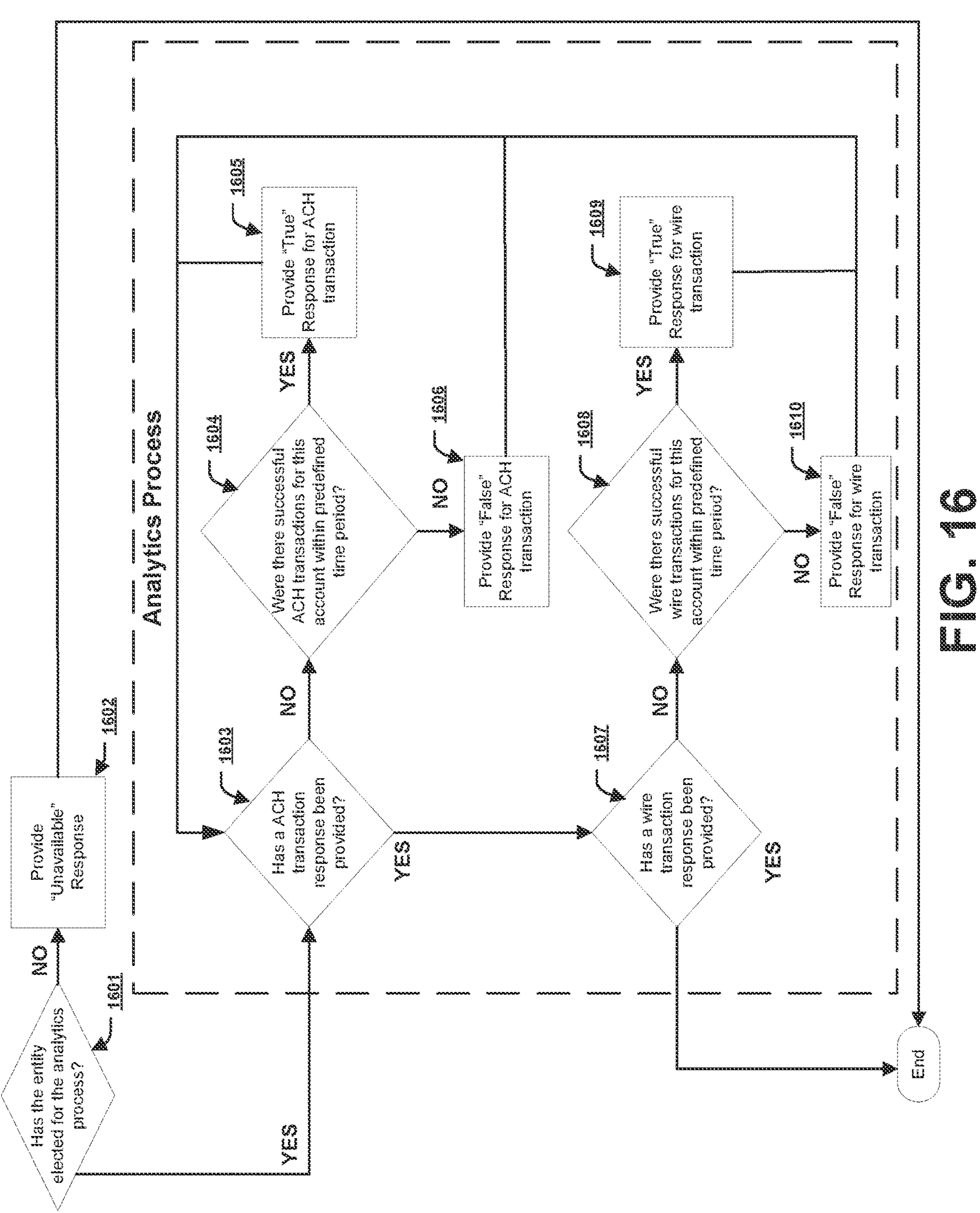
FIG. 16 provides an operational example of an analytics process workflow for generating an analytics response, in accordance with some example embodiments described herein.

Turning next to FIG. 16, an example workflow for an analytics process is shown. As shown in FIG. 16, first at operation 1601, it may be determined whether the entity (e.g., requesting entity) has elected for an analytics process to be performed. In an instance the entity did not elect for an analytics process, the workflow may proceed to operation 1602, where an "unavailable" response may be generated for the analytics response. In an instance in which the entity elected for an analytics process, the workflow may proceed to operation 1603, where it may be determined whether a particular payment type analytics response has been provided for an analytic payment type of interest. In an instance in which the particular payment type analytics response has not been provided for an analytic payment type of interest, the workflow may proceed to operation 1604. At operation 1604, it may be determined whether the beneficiary information is indicative of an occurrence of a successful transaction of the analytic payment type within a predefined time period. In an instance in which the beneficiary information is indicative of an occurrence of a successful transaction of the analytic payment type within a predefined time period, the workflow may proceed to operation 1605, where a "true" response may be generated for the analytics response. In an instance in which the beneficiary information is not indicative of an occurrence of a successful transaction of the analytic payment type within a predefined time period, the workflow may proceed to operation 1606, where a "false" response may be generated for the analytics response. The workflow may then proceed back to operation 1603.

In an instance in which the particular payment type analytics response has not been provided for an analytic payment type of interest, the workflow may proceed to operation 1607. At operation 1607, it may be determined whether the beneficiary information is indicative of an occurrence of a successful transaction of a next analytic payment type of interest within a predefined time period. In an instance in which the beneficiary information is indicative of an occurrence of a successful transaction of the analytic payment type within a predefined time period, the workflow may proceed to operation 1608, where a "true" response may be generated for the analytics response. In an instance in which the beneficiary information is not indicative of an occurrence of a successful transaction of the analytic payment type within a predefined time period, the workflow may proceed to operation 1608, where a "false" response may be generated for the analytics response. The workflow may then proceed back to operation 1603. Once payment type analytics response for all analytic payment types of interest are provided, the workflow may end.

FIGS. 3-7, 9-10, and 12-16 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved methods for transacting beneficiaries. Example embodiments thus provide tools that overcome the problems faced by conventional transaction system which fail to sufficiently evaluate beneficiary history such that these conventional methodologies lack insight into the trustworthiness of the beneficiary, a risk level for various payment types for transactions with the beneficiary, payment type preferences of the beneficiary, and more. Embodiments described herein address these shortcomings by leveraging shared account data as well as internal account data to generate and provide a beneficiary feedback response for a beneficiary of interest to a requesting entity. Example embodiments described herein are configured to generate a beneficiary feedback response that includes one or more of a verification response, scoring response, and/or analytics response that may then be provided to the requesting user. The requesting user may then leverage the information in the beneficiary feedback response to make a determination regarding a transaction with the beneficiary of interest. In this way, the requesting entity may save valuable computational and manual resources that would otherwise be devoted to modifying a payment type for a transaction and selectively using such resources only for beneficiaries with concerning behavior patterns.

Additionally, embodiments described herein leverage account data stored within a shared account repository that includes limited account data for users associated with financial institutions which are enrolled in a data sharing program, as well as account data stored within an internal account repository that includes private account data, including historical transaction data. By leveraging both publicly shared account data and private internal account data, a robust analysis of beneficiary accounts is able to be performed to yield a comprehensive beneficiary feedback response.

In some embodiments, the requesting entity may further optimize computational resources by allowing for the automatic effectuation of a transaction in a particular payment type, which may be indicated in the inquiry request, based on an analysis of a verification response, scoring response, and/or analytics response. The requesting entity may configure individual and flexible thresholds that must be satisfied by the verification response, scoring response, and/or analytics in order for a transaction to be effectuated. In an instance the thresholds are satisfied, the transaction may automatically be effectuated without input from the requesting entity. As such, the requesting entity may be assured that the beneficiary was determined to satisfy the criteria required for such a transaction without having to manually intervene.

In some embodiments, the one or more processes (e.g., verification process, scoring process, and analytics process) may be performed simultaneously, via parallel processing, such that a beneficiary feedback response may be generated in real-time or near real-time. Thus, this may allow a corresponding transaction to also be performed in real-time or near real-time such that any perceived delay due to these additional processes is mitigated.

Additionally, in some embodiments described herein, a beneficiary optimization response may be provided to the requesting entity, such as in a beneficiary feedback response. The beneficiary optimization response may include one or more enhanced alternative payment types that were determined to be preferential for the requesting entity for the particular transaction with the beneficiary. As such, the requesting entity may select the one or more enhanced alternative payment types such that a more effective payment type for the transaction may be selected and the transaction may be automatically modified to reflect this updated payment type. In this way, the requesting entity may know an optimal payment type is selected for the transaction.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for providing beneficiary feedback response, the method comprising:

receiving, by communications hardware, an inquiry request, wherein the inquiry request comprises inquiry data and a requested transaction corresponding to a payment type;

identifying, by processing circuitry and based on the inquiry data, a beneficiary account for a beneficiary of interest;

determining, by the processing circuitry and based on the inquiry request, at least one process to be performed on the inquiry data from one or more candidate processes, wherein the one or more candidate processes comprise (i) a scoring process and (ii) an analytics process;

in response to determining to perform the scoring process, performing, by scoring circuitry, the scoring process by:

calculating, by the scoring circuitry and based on the beneficiary account, a return metric for the payment type, wherein the return metric is indicative of at least one of (a) a number or percentage of transactions of the payment type that resulted in a return, (b) a number or percentage of initiated transactions of the payment type that were canceled, and (c) a number or percentage of transactions of the payment type that were unsuccessful, determining, by the scoring circuitry, whether the return metric satisfies a return metric threshold, generating, by the scoring circuitry, a payment type scoring response for the payment type based on whether the return metric satisfies the return metric threshold, and generating, by the scoring circuitry, a scoring response comprising the payment type scoring response;

in response to determining to perform the analytics process, performing, by analytics circuitry, the analytics process by:

determining, by the analytics circuitry, whether beneficiary account data from the beneficiary account is indicative of a successful historical transaction of the payment type that has occurred within a predefined time period, and generating, by the analytics circuitry, an analytics response based on whether the beneficiary account data is indicative of a successful historical transaction of the payment type;

generating, by the processing circuitry, the beneficiary feedback response, wherein the beneficiary feedback response comprises at least one of (i) the scoring response and (ii) the analytics response;

providing, by the communications hardware, the beneficiary feedback response;

determining, by effectuation circuitry, whether (i) the scoring response satisfies a scoring response threshold or (ii) the analytics response satisfies an analytic response threshold; and in response to determining that (i) the scoring response satisfies the scoring response threshold or (ii) the analytics response satisfies the analytic response threshold, effectuating, by effectuation circuitry, the requested transaction.

2. The method of claim 1, wherein identifying the beneficiary account for the beneficiary of interest further comprises:

identifying, by the processing circuitry, an inquiry data value for an inquiry data field;

determining, by the processing circuitry, whether the inquiry data value is indicative of an internal account number or a shared account number;

in response to determining the inquiry data value is indicative of an internal account number, identifying, by the processing circuitry, the beneficiary account from an internal account repository; and in response to determining the inquiry data value is indicative of a shared account number, identifying, by the processing circuitry, the beneficiary account from a shared account repository.

3. The method of claim 1, wherein the one or more candidate processes further includes a verification process, wherein, in response to determining to perform the verification process, performing, by verification circuitry, the verification process by:

identifying, by the verification circuitry, an inquiry data value from the inquiry data for an inquiry data field of interest;

identifying, by the verification circuitry, a stored data value from the identified beneficiary account, wherein the identified stored data value is associated with a data field corresponding to a same data field as the identified inquiry data value;

determining, by the verification circuitry, whether the identified stored data value and identified inquiry data value are an exact match;

in response to determining the identified stored data value and identified inquiry data value are an exact match, generating, by the verification circuitry, an inquiry data field verification response for an inquiry data field corresponding to the identified inquiry data value, wherein the inquiry data field verification response is indicative of an exact match for the inquiry data field; and generating, by the verification circuitry, a verification response comprising the inquiry data field verification response, wherein the beneficiary feedback response further comprises the verification response.

4. The method of claim 3, further comprising:

in response to determining the identified stored data value and identified inquiry data value are not an exact match, determining, by the verification circuitry and based on a comparison between the identified inquiry data value and the identified stored data value, a similarity score for the identified inquiry data value;

determining, by the verification circuitry, whether the similarity score satisfies a similarity score threshold; and in response to determining the similarity score satisfies the similarity score threshold, generating, by the verification circuitry, an inquiry data field verification response for an inquiry data field corresponding to the identified inquiry data value, wherein the inquiry data field verification response is indicative of a close match for the inquiry data field.

5. The method of claim 4, further comprising:

in response to determining the similarity score fails to satisfy the similarity score threshold, determining, by the verification circuitry, whether the identified inquiry data value is valid;

in response to determining the identified inquiry data value is valid, generating, by the verification circuitry, an inquiry data field verification response for an inquiry data field corresponding to the identified inquiry data value, wherein the inquiry data field verification response is indicative of no match for the inquiry data field; and in response to determining the identified inquiry data value is not valid, generating, by the verification circuitry, an inquiry data field verification response for an inquiry data field corresponding to the identified inquiry data value, wherein the inquiry data field verification response is indicative that this information is unavailable for the inquiry data field.

6. The method of claim 1, wherein performing the scoring process further comprises:

identifying, by the scoring circuitry, beneficiary account data from the beneficiary account that is associated with the payment type;

calculating, by the scoring circuitry and based on the identified beneficiary account data, an insight score for the payment type, wherein the insight score comprises one or more of a payment count, a payment volume, or a return count;

determining, by the scoring circuitry, whether the insight score satisfies a payment count threshold associated with the payment type;

in response to determining the insight score fails to satisfy the payment count threshold, generating, by the scoring circuitry, a payment type scoring response indicative that this information is unavailable for the payment type; and in response to determining the insight score satisfies the payment count threshold, calculating, by the scoring circuitry, the return metric for the payment type, wherein (a) the payment type scoring response is indicative of a high return rate for the payment type in response to determining the return metric fails to satisfy a return metric threshold and (b) the payment type scoring response is indicative of a low return rate for the payment type in response to determining the return metric satisfies a return metric threshold.

7. The method of claim 1, wherein the payment type comprises at least one of an automated clearing house payment type, a wire transfer payment type, an electronic check payment type, a peer-to-peer transfer payment type, an automated teller machine payment type, a point-of-sale payment type, or cryptocurrency payment type.

8. The method of claim 1, wherein performing the analytics process further comprises:

identifying, by the analytics circuitry, beneficiary account data from the beneficiary account that is associated with the payment type, wherein (a) the payment type analytics response is indicative of an existence of a successful historical transaction for the payment type in response to determining the beneficiary account data is indicative of a successful historical transaction of the payment type within the predefined time period, and (b) the payment type analytics response is indicative of an absence of a successful historical transaction for the payment type in response to determining the beneficiary account data is not indicative of a successful historical transaction of the payment type within the predefined time period.

9. An apparatus for providing beneficiary feedback response, the apparatus comprising:

communications hardware configured to:

receive an inquiry request, wherein the inquiry request comprises inquiry data and a requested transaction corresponding to a payment type;

processing circuitry configured to:

identify, based on the inquiry data, a beneficiary account for a beneficiary of interest, and determine, based on the inquiry request, at least one process to be performed on the inquiry data from one or more candidate processes, wherein the one or more candidate processes comprises (i) a scoring process and (ii) an analytics process;

scoring circuitry configured to, in response to determining to perform the scoring process, perform the scoring process by:

calculating, based on the beneficiary account, a return metric for the payment type, wherein the return metric is indicative of at least one of (a) a number or percentage of transactions of the payment type that resulted in a return, (b) a number or percentage of initiated transactions of the payment type that were canceled, and (c) a number or percentage of transactions of the payment type that were unsuccessful, determining whether the return metric satisfies a return metric threshold, generating a payment type scoring response for the payment type based on whether the return metric satisfies the return metric threshold, and generating, a scoring response comprising the payment type scoring response;

analytics circuitry configured to in response to determining to perform the analytics process, perform the analytics process by:

determining whether beneficiary account data from the beneficiary account is indicative of a successful historical transaction of the payment type that has occurred within a predefined time period, and generating an analytics response based on whether the beneficiary account data is indicative of a successful historical transaction of the payment type;

wherein the processing circuitry is further configured to generate the beneficiary feedback response, wherein the beneficiary feedback response comprises at least one of (i) the scoring response and (ii) the analytics response, wherein the communications hardware is further configured to provide the beneficiary feedback response; and effectuation circuitry configured to:

determining whether (i) the scoring response satisfies a scoring response threshold or (ii) the analytics response satisfies an analytic response threshold; and in response to determining that (i) the scoring response satisfies the scoring response threshold or (ii) the analytics response satisfies the analytic response threshold, effectuate the requested transaction.

10. The apparatus of claim 9, wherein the processing circuitry is further configured to:

identify an inquiry data value for an inquiry data field;

determine whether the inquiry data value is indicative of an internal account number or a shared account number;

in response to determining the inquiry data value is indicative of an internal account number, identify the beneficiary account from an internal account repository; and in response to determining the inquiry data value is indicative of a shared account number, identify the beneficiary account from a shared account repository.

11. The apparatus of claim 9, wherein the one or more candidate processes further includes a verification process, wherein the apparatus further comprises verification circuitry configured to, in response to determining to perform the verification process, perform the verification process by:

identifying an inquiry data value from the inquiry data for an inquiry data field of interest;

identifying a stored data value from the identified beneficiary account, wherein the identified stored data value is associated with a data field corresponding to a same data field as the identified inquiry data value;

determining whether the identified stored data value and identified inquiry data value are an exact match;

in response to determining the identified stored data value and identified inquiry data value are an exact match, generate an inquiry data field verification response for an inquiry data field corresponding to the identified inquiry data value, wherein the inquiry data field verification response is indicative of an exact match for the inquiry data field; and generating, by the verification circuitry, a verification response comprising the inquiry data field verification response, wherein the beneficiary feedback response further comprises the verification response.

12. The apparatus of claim 11, wherein the verification circuitry is further configured to:

in response to determining the identified stored data value and identified inquiry data value are not an exact match, determine, based on a comparison between the identified inquiry data value and the identified stored data value, a similarity score for the identified inquiry data value;

determine whether the similarity score satisfies a similarity score threshold; and in response to determining the similarity score satisfies the similarity score threshold, generate an inquiry data field verification response for an inquiry data field corresponding to the identified inquiry data value, wherein the inquiry data field verification response is indicative of a close match for the inquiry data field.

13. The apparatus of claim 12, wherein the verification circuitry is further configured to:

in response to determining the similarity score fails to satisfy the similarity score threshold, determine whether the identified inquiry data value is valid;

in response to determining the identified inquiry data value is valid, generate an inquiry data field verification response for an inquiry data field corresponding to the identified inquiry data value, wherein the inquiry data field verification response is indicative of no match for the inquiry data field; and in response to determining the identified inquiry data value is not valid, generate an inquiry data field verification response for an inquiry data field corresponding to the identified inquiry data value, wherein the inquiry data field verification response is indicative that this information is unavailable for the inquiry data field.

14. The apparatus of claim 9, wherein the scoring circuitry is further configured to perform the scoring process by:

identifying beneficiary account data from the beneficiary account that is associated with the payment type;

calculating, based on the identified beneficiary account data, an insight score for the payment type, wherein the insight score comprises one or more of a payment count, a payment volume, or a return count;

determining whether the insight score satisfies a payment count threshold associated with the payment type;

in response to determining the insight score fails to satisfy the payment count threshold, generating a payment type scoring response indicative that this information is unavailable for the payment type; and in response to determining the insight score satisfies the payment count threshold, calculating the return metric for the payment type, wherein (a) the payment type scoring response is indicative of a high return rate for the payment type in response to determining the return metric fails to satisfy a return metric threshold and (b) the payment type scoring response is indicative of a low return rate for the payment type in response to determining the return metric satisfies a return metric threshold.

15. A computer program product for providing a beneficiary feedback response, the computer program product comprising at least one non-transitory computer-readable storage medium storing software instructions that, when executed, cause an apparatus to:

receive an inquiry request, wherein the inquiry request comprises inquiry data and a requested transaction corresponding to a payment type;

identify, based on the inquiry data, a beneficiary account for a beneficiary of interest;

determine, based on the inquiry request, at least one process to be performed on the inquiry data from one or more candidate processes, wherein the one or more candidate processes comprises a scoring process and (ii) an analytics process;

in response to determining to perform the scoring process, perform the scoring process by:

calculating, based on the beneficiary account, a return metric for the payment type, wherein the return metric is indicative of at least one of (a) a number or percentage of transactions of the payment type that resulted in a return, (b) a number or percentage of initiated transactions of the payment type that were canceled, and (c) a number or percentage of transactions of the payment type that were unsuccessful, determining, whether the return metric satisfies a return metric threshold, generating a payment type scoring response for the payment type based on whether the return metric satisfies the return metric threshold, and generating a scoring response comprising the payment type scoring response;

in response to determining to perform the analytics process, perform the analytics process by:

determining whether beneficiary account data from the beneficiary account is indicative of a successful historical transaction of the payment type that has occurred within a predefined time period, and generating an analytics response based on whether the beneficiary account data is indicative of a successful historical transaction of the payment type;

generate the beneficiary feedback response, wherein the beneficiary feedback response comprises at least one of (i) the scoring response and (ii) the analytics response;

provide the beneficiary feedback response;

determine whether (i) the scoring response satisfies a scoring response threshold or (ii) the analytics response satisfies an analytic response threshold; and in response to determining that (i) the scoring response satisfies the scoring response threshold or (ii) the analytics response satisfies the analytic response threshold, effectuate the requested transaction.

16. The apparatus of claim 9, wherein the analytics circuitry is further configured to perform the analytics process by:

identifying, by the analytics circuitry, beneficiary account data from the beneficiary account that is associated with the payment type, wherein (a) the payment type analytics response is indicative of an existence of a successful historical transaction for the payment type in response to determining the beneficiary account data is indicative of a successful historical transaction of the payment type within the predefined time period and (b) the payment type analytics response is indicative of an absence of a successful historical transaction for the payment type in response to determining the beneficiary account data is not indicative of a successful historical transaction of the payment type within the predefined time period.

17. The computer program product of claim 15, wherein the software instructions, when executed, further cause the apparatus to perform the analytics process by:

identifying beneficiary account data from the beneficiary account that is associated with the payment type;

calculating, based on the identified beneficiary account data, an insight score for the payment type, wherein the insight score comprises one or more of a payment count, a payment volume, or a return count;

determining whether the insight score satisfies a payment count threshold associated with the payment type;

in response to determining the insight score fails to satisfy the payment count threshold, generating a payment type scoring response indicative that this information is unavailable for the payment type; and in response to determining the insight score satisfies the payment count threshold, calculating the return metric for the payment type, wherein (a) the payment type scoring response is indicative of a high return rate for the payment type in response to determining the return metric fails to satisfy a return metric threshold and (b) the payment type scoring response is indicative of a low return rate for the payment type in response to determining the return metric satisfies a return metric threshold.

18. The computer program product of claim 15, wherein the software instructions, when executed, further cause the apparatus to perform the analytics process by:

identifying beneficiary account data from the beneficiary account that is associated with the payment type, wherein (a) the payment type analytics response is indicative of an existence of a successful historical transaction for the payment type in response to determining the beneficiary account data is indicative of a successful historical transaction of the payment type within the predefined time period and (b) the payment type analytics response is indicative of an absence of a successful historical transaction for the payment type in response to determining the beneficiary account data is not indicative of a successful historical transaction of the payment type within the predefined time period.

19. The computer program product of claim 15, wherein the software instructions, when executed, further cause the apparatus to:

identify the beneficiary account for the beneficiary of interest further comprises:

identify an inquiry data value for an inquiry data field;

determine whether the inquiry data value is indicative of an internal account number or a shared account number;

in response to determining the inquiry data value is indicative of an internal account number, identify the beneficiary account from an internal account repository; and in response to determining the inquiry data value is indicative of a shared account number, identify the beneficiary account from a shared account repository.

20. The computer program product of claim 15, wherein the one or more candidate processes further includes a verification process, wherein the software instructions, when executed and in response to determining to perform the verification process, perform the verification process by:

identifying an inquiry data value from the inquiry data for an inquiry data field of interest;

identifying a stored data value from the identified beneficiary account, wherein the identified stored data value is associated with a data field corresponding to a same data field as the identified inquiry data value;

determining whether the identified stored data value and identified inquiry data value are an exact match;

in response to determining the identified stored data value and identified inquiry data value are an exact match, generating an inquiry data field verification response for an inquiry data field corresponding to the identified inquiry data value, wherein the inquiry data field verification response is indicative of an exact match for the inquiry data field; and generating a verification response comprising the inquiry data field verification response, wherein the beneficiary feedback response further comprises the verification response.

* * * * *